(12) United States Patent
Kundu et al.

(10) Patent No.: US 12,177,847 B2
(45) Date of Patent: Dec. 24, 2024

(54) RESOURCE ALLOCATION FOR PHYSICAL UPLINK CONTROL CHANNEL DURING INITIAL ACCESS IN NR-UNLICENSED

(71) Applicant: Apple Inc., Cupertino, CA (US)

(72) Inventors: Lopamudra Kundu, Santa Clara, CA (US); Gang Xiong, Portland, OR (US); Yongjun Kwak, Portland, OR (US); Yingyang Li, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 448 days.

(21) Appl. No.: 17/414,486

(22) PCT Filed: Jan. 9, 2020

(86) PCT No.: PCT/US2020/012946
§ 371 (c)(1),
(2) Date: Jun. 16, 2021

(87) PCT Pub. No.: WO2020/146643
PCT Pub. Date: Jul. 16, 2020

(65) Prior Publication Data
US 2022/0086824 A1    Mar. 17, 2022

Related U.S. Application Data

(60) Provisional application No. 62/790,899, filed on Jan. 10, 2019.

(51) Int. Cl.
*H04W 72/04*    (2023.01)
*H04B 1/713*    (2011.01)
(Continued)

(52) U.S. Cl.
CPC ............ *H04W 72/21* (2023.01); *H04B 1/713* (2013.01); *H04L 1/1812* (2013.01)

(58) Field of Classification Search
CPC ..... H04B 1/713; H04L 1/1812; H04L 5/0053; H04L 5/0055; H04W 72/21
See application file for complete search history.

(56) References Cited

U.S. PATENT DOCUMENTS

| | | |
|---|---|---|
| 2017/0245263 A1 | 8/2017 | Li et al. |
| 2018/0019851 A1 | 1/2018 | Takeda et al. |

(Continued)

FOREIGN PATENT DOCUMENTS

| | | |
|---|---|---|
| CN | 107211280 A | 9/2017 |
| CN | 109155710 A | 1/2019 |

(Continued)

OTHER PUBLICATIONS

Chinese Office Action and Search Report directed to related Chinese Patent Application No. 202080008735.2, mailed Jan. 15, 2024, with English-language machine translation of the Search Report attached, 13 pages.

(Continued)

*Primary Examiner* — Mansour Oveissi
(74) *Attorney, Agent, or Firm* — Sterne, Kessler, Goldstein & Fox P.L.L.C.

(57) ABSTRACT

Systems, apparatuses, methods, and computer-readable media are provided for use in a wireless network for resource allocation during initial access. Some embodiments are directed to an apparatus including processor circuitry and radio front circuitry. The processor circuitry can be configured to determine, in accordance with a predetermined requirement, multiple physical resource blocks (PRBs) to be used for transmitting a physical uplink control channel (PUCCH) before a dedicated PUCCH resource configuration. The radio front end circuitry coupled with the processor circuitry can be configured to transmit the PUCCH using the determined PRBs and before the dedicated PUCCH resource configuration. The dedicated PUCCH resource configuration (Continued)

can include initial access before Radio Resource Control (RRC) connection setup.

20 Claims, 15 Drawing Sheets

(51) Int. Cl.
    *H04L 1/1812*     (2023.01)
    *H04W 72/21*     (2023.01)

(56) References Cited

U.S. PATENT DOCUMENTS

| | | | |
|---|---|---|---|
| 2019/0191441 A1 | 6/2019 | Kusashima | |
| 2019/0261356 A1* | 8/2019 | Myung | H04W 72/02 |
| 2019/0387546 A1* | 12/2019 | Li | H04L 27/26132 |
| 2021/0029731 A1* | 1/2021 | Kundu | H04W 74/004 |

FOREIGN PATENT DOCUMENTS

| | | |
|---|---|---|
| TW | 201807990 A | 3/2018 |
| WO | WO-2017022777 A1 | 2/2017 |
| WO | WO-2017219284 A1 | 12/2017 |

OTHER PUBLICATIONS

International Search Report and Written Opinion directed to related International Application No. PCT/US2020/012946, issued on Apr. 14, 2020, 13 pages.
Huawei et al., "UCI transmission in NR operations in unlicensed", 3GPP Draft; R1-1803682, 3GPP RAN WG1 Meeting #92bis, Sanya, China; Apr. 16, 2018-Apr. 20, 2018 Apr. 15, 2018 (Apr. 15, 2018), XP051425979, 6 pages.
Oppo, "Offline summary on maintenance for R15 NR PUCCH resource", 3GPP Draft; R1-1811951, 3GPP RAN WG1 Meeting #94, Chengdu, China; Oct. 8, 2018-Oct. 12, 2018, Oct. 11, 2018 (Oct. 11, 2018), XP051519276, 8 pages.
Nokia et al., "On uplink signal and channel structures for NR-U", 3GPP Draft; R1-1812660, 3GPP TSG RAN WG1 Meeting #95, Spokane, USA; Nov. 12, 2018-Nov. 16, 2018, Nov. 11, 2018 (Nov. 11, 2018), XP051554616, 18 pages.
Intel Corporation, "Initial access signals/channels for NR-unlicensed", 3GPP Draft; R1-1900467, 3GPP TSG RAN WG1 Ad-Hoc Meeting 1901, Taipei, Taiwan; jan. 21, 2019-Jan. 25, 2019, Jan. 12, 2019 ( Jan. 12, 2019), XP051576075, 7 pages.
Intel Corporation, "UL signals and channels for NR-unlicensed", 3GPP Draft; R1-1906784, 3GPP RAN WG1 #97, Reno, Nevada, USA; May 13, 2019-May 17, 2019, May 4, 2019 ( May 4, 2019), XP051708820, 13 pages.

* cited by examiner

RESOURCE ALLOCATION FOR PHYSICAL UPLINK CONTROL CHANNEL DURING INITIAL ACCESS IN NR-UNLICENSED

CROSS REFERENCE TO RELATED APPLICATIONS

This application is a U.S. National Phase of International Application No. PCT/US2020/012946, filed Jan. 9, 2020, which claims the benefit under 35 U.S.C. § 119(e) of U.S. Provisional Application No. 62/790,899, filed Jan. 10, 2019, which are hereby incorporated by reference in their entireties.

BACKGROUND

Various embodiments generally may relate to the field of wireless communications.

SUMMARY

Some embodiments of this disclosure include systems, apparatuses, methods, and computer-readable media for use in a wireless network for resource allocation during initial access.

Some embodiments are directed to an apparatus including processor circuitry and radio front circuitry. The processor circuitry can be configured to determine, in accordance with a predetermined requirement, multiple physical resource blocks (PRBs) to be used for transmitting over an initial physical uplink control channel (PUCCH) before a dedicated PUCCH resource is configured. The radio front end circuitry coupled with the processor circuitry can be configured to transmit over the initial PUCCH using the determined PRBs and before the dedicated PUCCH resource is configured. The dedicated PUCCH resource configuration can be associated with a Radio Resource Control (RRC) connection setup.

Some embodiments are directed to a user equipment (UE). The UE can include a memory that stores instructions and a processor. The processor, upon executing the instructions, can be configured to determine, in accordance with a predetermined requirement, multiple physical resource blocks (PRBs) to be used for transmitting over an initial physical uplink control channel (PUCCH) before a dedicated PUCCH resource is configured. The processor can be further configured to cause transmission of (control) data over the initial PUCCH using the determined PRBs and before the dedicated PUCCH resource is configured. The dedicated PUCCH resource configuration can be associated with a Radio Resource Control (RRC) connection setup.

Some embodiments are directed to a method including determining, in accordance with a predetermined requirement, multiple physical resource blocks (PRBs) to be used for transmitting data over an initial physical uplink control channel (PUCCH) before a dedicated PUCCH resource is configured. The method further includes allocating the multiple PRBs contiguously or non-contiguously in frequency and transmitting data over the initial PUCCH using the determined PRBs and before the dedicated PUCCH resource is configured. The dedicated PUCCH resource configuration can be associated with a Radio Resource Control (RRC) connection setup.

BRIEF DESCRIPTION OF THE DRAWINGS/FIGURES

Figure 1:
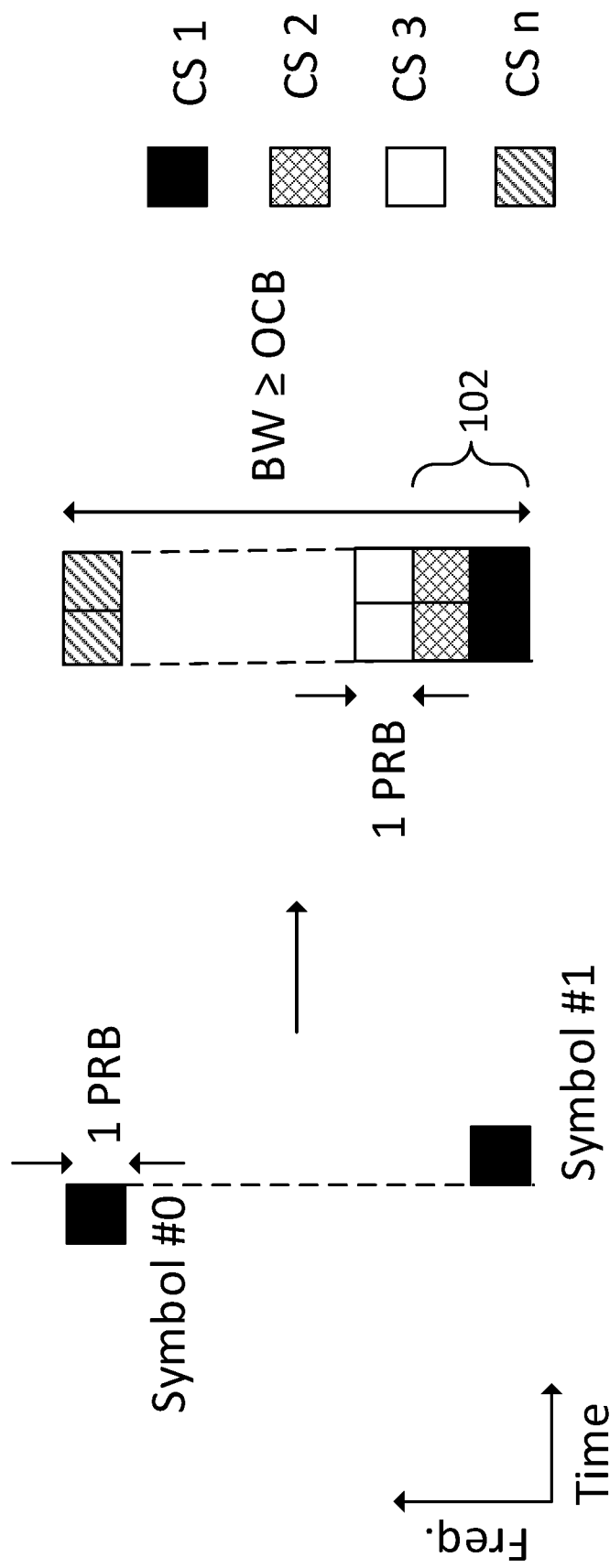
FIG. 1 depicts an example of using contiguous physical resource blocks (PRBs), in accordance with some embodiments.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

INTRODUCTION

One major enhancement for LTE in Rel-13 has been to enable the operation of cellular networks in the unlicensed spectrum, via LAA. Ever since, exploiting the access of unlicensed spectrum is considered by 3GPP as one of the promising solutions to cope with the increasing growth of wireless data traffic.

Following the trend of LTE enhancements, one of the primary objectives is to identify additional functionalities that are needed for PHY layer design of new radio (NR) to operate in unlicensed spectrum. In particular, it is desirable to minimize the design efforts by identifying the essential enhancements needed for Rel-15 NR design to enable unlicensed operation, while avoiding unnecessary divergence from Rel-15 NR licensed framework. Coexistence methods already defined for LTE-based LAA context should be assumed as the baseline for the operation of NR-unlicensed systems, while enhancements over these existing methods are not precluded. NR-based operation in unlicensed spectrum should not impact deployed Wi-Fi services (e.g., data, video and voice services) more than an additional Wi-Fi network on the same carrier.

Regulatory requirements must be mandatorily met by networks and systems operating in unlicensed spectrum. One of such regulatory restrictions imposed on physical channels/signals operating in unlicensed spectrum is related to the bandwidth occupied by these channels/signals, referred to as Occupied Channel Bandwidth (OCB). According to ETSI harmonised standard for 5 GHz, limits on OCB are stated as follows:

The Occupied Channel Bandwidth shall be between 80% and 100% of the Nominal Channel Bandwidth. In case of smart antenna systems (devices with multiple transmit chains) each of the transmit chains shall meet this requirement. The Occupied Channel Bandwidth might change with time/payload. During a Channel Occupancy Time (COT), equipment may operate temporarily with an Occupied Channel Bandwidth of less than 80% of its Nominal Channel Bandwidth with a minimum of 2 MHz.

In addition to restrictions on OCB, there are important regulatory rules on power usage by networks and systems operating in unlicensed spectrum, as follows:

Regulations on the maximum power spectral density are typically stated with a resolution bandwidth of 1 MHz. The ETSI specification requires a maximum Power Spectral Density (PSD) of 10 dBm/MHz for 5150-5350 MHz, while Federal Communications Commission (FCC) has a maximum PSD of 11 dBm/MHz for 5150-5350 MHz. Additionally, regulations require 10 KHz resolution for testing the 1 MHz PSD constraint and, thus, the maximum PSD constraint should be met in any occupied 1 MHz bandwidth.

In addition, the regulations impose a band specific total maximum transmission power in terms of EIRP, e.g., ETSI has EIRP limit of 23 dBm for 5150-5350 MHz.

The regulatory limitations imposed in terms of OCB and PSD guided the design choices for the uplink channels of legacy LTE-unlicensed system and it will not be any different for NR-unlicensed system as well. Legacy LTE-unlicensed system or Rel-14 eLAA was designed to meet the aforementioned regulations while utilizing the available spectrum efficiently. But the enhancement of LTE-unlicensed design to NR-unlicensed will not be straightforward, since NR is targeted to support diverse numerology configurations with much wider channel bandwidth than LTE's 20 MHz. On the other hand, though it is desirable to avoid unnecessary divergence from Rel-15 NR framework as much as possible while designing uplink physical signals/channels for NR-unlicensed spectrum, the regulatory constraints will necessitate redesign of NR physical signals/channels to certain extents in order to meet the essential requirements of unlicensed spectrum usage.

In the above context, the present disclosure discusses potential enhancements of resource allocation to NR PUCCH during initial access, for example, before RRC connection setup to meet the regulatory requirements in unlicensed spectrum.

Currently, the baseline PUCCH resource configuration before RRC connection setup is based on two different PUCCH formats, viz. PUCCH format 0 and PUCCH format 1 in NR licensed spectrum. The primary purpose of this PUCCH resource configuration is to enable transmission of 1-bit hybrid automatic repeat request-acknowledgement (HARQ-ACK) over PUCCH in response to message 4 during initial access. However, legacy NR-licensed PUCCH resource configuration before RRC connection setup using formats 0 and 1 is not suitable for NR-unlicensed spectrum, since unlicensed spectrum utilization is restricted by regulatory limitations, especially in terms of OCB, which cannot be fulfilled by existing single PRB NR-PUCCH formats 0 and 1 designed for licensed spectrum.

The present disclosure provides embodiments that enhance NR PUCCH resource sets before dedicated PUCCH configuration via RRC signaling to enable PUCCH configuration during initial access in NR-unlicensed (NR-U). The present disclosure also provides embodiments related to PUCCH resource configuration for NR-U. The enhanced NR PUCCH resource configuration before RRC connection setup enables HARQ-ACK feedback over PUCCH in response to message 4 during initial access over unlicensed spectrum. Additionally, the present disclosure provides and/or defines parameters required to configure PUCCH resource for the transmission of uplink control information (UCI) over PUCCH in response to message 4 during initial access using unlicensed spectrum.

UCI Reporting in Physical Uplink Control Channel

UCI types reported in a PUCCH include HARQ-ACK information, SR, and CSI. UCI bits include HARQ-ACK information bits, if any, SR information bits, if any, and CSI bits, if any. The HARQ-ACK information bits correspond to a HARQ-ACK codebook. A UE may transmit one or two PUCCHs on a serving cell in different symbols within a slot of $N_{symb}^{slot}$ symbols. When the UE transmits two PUCCHs in a slot, at least one of the two PUCCHs uses PUCCH format 0 or PUCCH format 2.

If a UE receives a PDSCH without receiving a corresponding PDCCH, or if the UE receives a PDCCH indicating a SPS PDSCH release, the UE generates one corresponding HARQ-ACK information bit. If a UE is not provided higher layer parameter PDSCH-CodeBlockGroupTransmission, the UE generates one HARQ-ACK information bit per transport block. A UE does not expect to be indicated to transmit HARQ-ACK information for more than two SPS PDSCH receptions in a same PUCCH. The CRC for DCI format 1_0 is scrambled with a C-RNTI, an MCS-C-RNTI, or a CS-RNTI and the CRC for DCI format 1_1 is scrambled with a C-RNTI or an MCS-C-RNTI.

PUCCH Resource Sets

The baseline structure of PUCCH resource sets before dedicated PUCCH resource configuration include the following aspects.

If a UE (e.g., UE 501 of FIG. 5 infra) does not have dedicated PUCCH resource configuration, provided by higher layer parameter PUCCH-ResourceSet in PUCCH-Config, a PUCCH resource set is provided by higher layer parameterpucch-ResourceCommon in SystemInformationBlockType1 through an index to a row of table 1 for transmission of HARQ-ACK information on PUCCH in an initial active UL BWP of $N_{BWP}^{size}$ PRBs provided by SystemInformationBlockType1. The index to a row of table 1 may be a 4-bit remaining minimum system information (RMSI) index, and each row in the table configures a set of 16 cell-specific PUCCH resources. As shown by table 1, a PUCCH resource includes or is indicated by 5 parameters: a PUCCH format, a starting symbol, a duration, a PRB offset $RB_{BWP}^{offset}$, and a set of initial cyclic shift (CS) indices (or a CS index set for a PUCCH transmission).

The PUCCH resource set includes sixteen resources, each corresponding to a PUCCH format, a first symbol, a duration, a PRB offset $RB_{BWP}^{offset}$, and a CS index set for a PUCCH transmission. The supported PUCCH durations and starting symbols, which may always be aligned with slot boundary, include symbol duration 2/4/10/14→starting symbol index #12/#10/#4/#0. The supported PUCCH formats include PUCCH format 0 and PUCCH format 1 (e.g., for a single PRB). The supported PUCCH payload size is only 1-bit, which may be a HARQ-ACK in response to message 4 during initial access.

In some embodiments, frequency hopping is always enabled. The UE transmits a PUCCH using frequency hopping. An orthogonal cover code with index 0 is used for a PUCCH resource with PUCCH format 1 in table 1. The UE transmits the PUCCH using the same spatial domain transmission filter as for the Msg3 PUSCH transmission.

The UE does not expect to generate more than one HARQ-ACK information bit prior to establishing RRC connection.

If the UE provides HARQ-ACK information in a PUCCH transmission in response to detecting a DCI format 1_0 or DCI format 1_1, the UE determines a PUCCH resource with index $r_{PUUCH}$, $0 \leq r_{PUCCH} \leq 15$, as $r_{PUCCH} = \lfloor 2 \cdot n_{CCE,o}/N_{CCE} \rfloor + 2 \cdot \Delta_{PRI}$, where $N_{CCE}$ is a number of CCEs in a control resource set of a PDCCH reception with DCI format 1_0 or DCI format 1_1, as described in Subclause 10.1, n, is the index of a first CCE for the PDCCH reception, and $\Delta_{PRI}$ is a value of the PUCCH resource indicator field in the DCI format 1_0 or DCI format 1_1. The 3 bit PUCCH resource indicator in DCI format 1_0 or 1_1 and starting CCE index (for 1-bit) is used to derive PUCCH resource index $r_{PUCCH}$ ($0 \leq r_{PUCCH} \leq 15$) according to the following equation.

$$r_{PUCCH} = \left\lfloor \frac{2 \cdot n_{CCE,0}}{N_{CCE,0}} \right\rfloor + 2 \cdot \Delta_{PRI}$$

Starting CCE index for the detected PDCCH in CORESET 0

Total number of CCEs in CORESET 0 for PDCCCH monitoring

PUCCH resource indicator in the DCI 1-0 and 1-1 (3 bit)

PRB indices, hopping direction and initial CS index are determined from PUCCH resource index $r_{PUCCH}$. PRB indices (in $1^{st}$ and $2^{nd}$ frequency hops) are functions of PRB offset ($RB_{BWP}^{offset}$), total number of cyclic shift indices in the cyclic shift index set ($N_{CS}$) and PUCCH resource index $r_{PUCCH}$. Initial cyclic shift index in the set of initial cyclic shift indexes is a function of $r_{PUCCH}$ and $N_{CS}$.

If $\lfloor r_{PUCCH}/8 \rfloor = 0$, the UE determines the PRB index of the PUCCH transmission in the first hop as $RB_{BWP}^{offset} + \lfloor r_{PUCCH}/N_{CS} \rfloor$. and the PRB index of the PUCCH transmission in the second hop as $N_{BWP}^{size} - 1 - RB_{BWP}^{offset} - \lfloor r_{PUCCH}/N_{CS} \rfloor$, where $N_{CS}$ is the total number of initial cyclic shift indexes in the set of initial cyclic shift indexes the UE determines the initial cyclic shift index in the set of initial cyclic shift indexes as $r_{PUCCH}$ mod $N_{CS}$.

If $\lfloor r_{PUCCH}/8 \rfloor = 1$, the UE determines the PRB index of the PUCCH transmission in the first hop as $N_{BWP}^{size} - 1 - RB_{BWP}^{offset} - \lfloor (r_{PUCCH} - 8)/N_{CS} \rfloor$ and the PRB index of the PUCCH transmission in the second hop as $RB_{BWP}^{offset} + \lfloor (r_{PUCCH} - 8)/N_{CS} \rfloor$.

the UE determines the initial cyclic shift index in the set of initial cyclic shift indexes as $(r_{PUCCH} - 8)$ mod $N_{CS}$.

In an example where a corresponding to index 0 in table 1, $RB_{BWP}^{offset} = 0$ and set of initial CS indices={0, 3}, then for $0 \leq r_{PUCCH} \leq 15$, PRB indices in the $1^{st}$ and $2^{nd}$ hops and initial CS index are:

PRB indices in the $1^{st}$ hop={0,0,1,1,2,2,3,3, [$N_{BWP}^{size}$-1-{0,0,1,1,2,2,3,3}]}

PRB indices in the $2^{nd}$ hop={[$N_{BWP}^{size}$-1-{0,0,1,1,2,2,3,3}],0,0,1,1,2,2,3,3}

Initial CS index in the set of CS indices={0,1,0,1,0,1,0,1,0,1,0,1,0,1,0,1}→CS index from the last column and first row of Table 1={0,3,0,3,0,3,0,3,0,3,0,3,0,3,0,3}

Examples with different values of $r_{PUCCH}$, then for $r_{PUCCH} = 3 \rightarrow$ {PRB index $1^{st}$ hop, PRB index $2^{nd}$ hop, initial CS}={1,($N_{BWP}^{size}$-1-1), 3}, and for $r_{PUCCH} = 12 \rightarrow$ {PRB index $1^{st}$ hop, PRB index $2^{nd}$ hop, initial CS}={($N_{BWP}^{size}$-1-2), 2, 0}.

TABLE 1

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

If a UE has dedicated PUCCH resource configuration, the UE is provided by higher layers with one or more PUCCH resources.

A PUCCH resource includes the following parameters:

a PUCCH resource index provided by higher layer parameter pucch-ResourceId an index of the first PRB prior to frequency hopping or for no frequency hopping by higher layer parameter starlingPRB an index of the first PRB after frequency hopping by higher layer parameter secondHopPRB;

an indication for intra-slot frequency hopping by higher layer parameter intraSlotFrequencyHopping a configuration for a PUCCH format, from PUCCH format 0 through PUCCH format 4, provided by higher layer parameterformat If the higher layer parameterformat indicates PUCCH-format0, the PUCCH format configured for a PUCCH resource is PUCCH format 0, where the PUCCH resource also includes an index for an initial cyclic shift provided by higher layer parameter initialCyclicShfit, a number of symbols for a PUCCH transmission provided by higher layer parameter nrofSymbols, a first symbol for the PUCCH transmission provided by higher layer parameter startingSymbolIndex.

If the higher layer parameterformat indicates PUCCH-format1, the PUCCH format configured for a PUCCH resource is PUCCH format 1, where the PUCCH resource also includes an index for an initial cyclic shift provided by higher layer parameter initialCyclicShift, a number of symbols for a PUCCH transmission provided by higher layer parameter nrofSymbols, a first symbol for the PUCCH transmission provided by higher layer parameter startingSymbolIndex, and an index for an orthogonal cover code by higher layer parameter timeDomainOCC.

If the higher layer parameterformat indicates PUCCH-format2 or PUCCH-format3, the PUCCH format configured for a PUCCH resource is PUCCH format 2 or PUCCH format 3, respectively, where the PUCCH resource also includes a number of PRBs provided by higher layer parameter nrofPRBs, a number of symbols for a PUCCH transmission provided by higher layer parameter nrofSymbols, and a first symbol for the PUCCH transmission provided by higher layer parameter startingSymbolIndex.

If the higher layer parameterformat indicates PUCCH-format4, the PUCCH format configured for a PUCCH resource is PUCCH format 4, where the PUCCH resource also includes a number of symbols for a PUCCH transmission provided by higher layer parameter nrofSymbols, a length for an orthogonal cover code by higher layer parameter occ-Length, an index for an orthogonal cover code by higher layer parameter occ-Index, and a first symbol for the PUCCH transmission provided by higher layer parameter startingSymbolIndex.

A UE can be configured up to four sets of PUCCH resources. A PUCCH resource set is provided by higher layer parameter PUCCH-ResourceSet and is associated with a PUCCH resource set index provided by higher layer parameter pucch-ResourceSetId, with a set of PUCCH resource indexes provided by higher layer parameter resourceList that provides a set of pucch-ResourceId used in the PUCCH resource set, and with a maximum number of UCI information bits the UE can transmit using a PUCCH resource in the PUCCH resource set provided by higher layer parameter maxPayloadMinus1. For the first PUCCH resource set, the maximum number of UCI information bits is 2. A maximum number of PUCCH resource indexes for a set of PUCCH resources is provided by higher layer parameter maxNrofPUCCH-ResourcesPerSet. The maximum number of PUCCH resources in the first PUCCH resource set is 32 and the maximum number of PUCCH resources in the other PUCCH resource sets is 8.

If the UE transmits $N_{UCI}$ UCI information bits, that include HARQ-ACK information bits, the UE determines a PUCCH resource set to be:

a first set of PUCCH resources with pucch-ResourceSetId=0 if $N_{UCI} \leq 2$ including 1 or 2 HARQ-ACK information bits and a positive or negative SR on one SR transmission occasion if transmission of HARQ-ACK information and SR occurs simultaneously, or a second set of PUCCH resources with pucch-ResourceSetId=1, if provided by higher layers, if $2 < N_{UCI} \leq N_2$ where $N_2$ is provided by higher layer parameter maxPayloadMinus1 for the PUCCH resource set with pucch-ResourceSetId=1, or a third set of PUCCH resources with pucch-ResourceSetId=2, if provided by higher layers, if $N_2 < N_{UCI} \leq N_3$ where $N_3$ is provided by higher layer parameter maxPayloadMinus1 for the PUCCH resource set with pucch-ResourceSetId=2, or a fourth set of PUCCH resources with pucch-ResourceSetId=3, if provided by higher layers, if $N_3 < N_{UCI} \leq 1706$.

Enhancements to PUCCH Resource Sets Before Dedicated PUCCH Resource Configuration In NR-unlicensed, transmission of all signals/channels must abide by the regulatory requirements related to OCB, which is a minimum of 2 MHz. Since a single PRB transmission in FR1 cannot meet this requirement, PUCCH resource sets are to be enhanced to support multi-PRB transmission in order to fulfil OCB related regulatory criteria. The enhancements from single PRB to multi-PRB transmission can be categorized as follows: (1) Contiguous PRB allocation, and (2) Non-contiguous PRB allocation (e.g., interlace based). Enhancements related to each of these frequency allocation schemes are detailed below.

Embodiment 1: Enhancements to PUCCH Resource Sets Configuration During Initial Access with Contiguous PRB Allocation Embodiment 1-1: Using PUCCH Formats 0 and 1

In embodiments, PUCCH resource set before RRC connection set up can be configured using existing PUCCH formats used in NR-licensed operation, i.e. PUCCH formats 0 and 1 which are inherently single-PRB (each PRB consisting of 12 sub-carriers) PUCCH formats. Both these single-PRB PUCCH formats can be enhanced to multiple PRBs (say, n PRBs) so that OCB requirement is met. Further, these n PRBs can be allocated contiguously in frequency, where $$n \geq [\{OCB/(12*SCS)\}]$$

Figure 2:
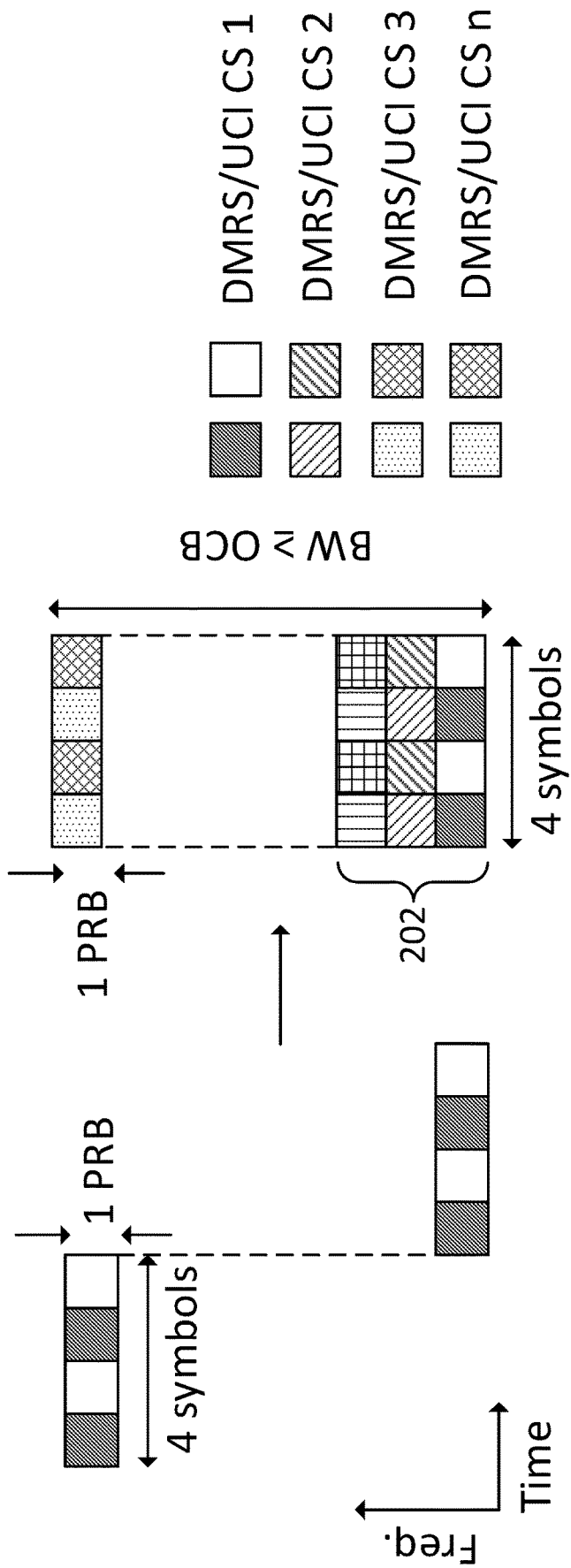
FIG. 2 depicts another example of using contiguous physical resource blocks (PRBs), in accordance with some embodiments.

OCB is the occupied channel bandwidth criteria mandated by regulation (for example 80%-100% of nominal channel bandwidth or temporally, 2 MHz bandwidth) and SCS is sub-carrier spacing (for example, in FR1, SCS for PUCCH maybe 15/30/60 KHz). Appropriate scaling would be applied in the above expression of n if OCB and SCS are expressed in different units. FIGS. 1 and 2 illustrate enhancements of PUCCH format 0 and PUCCH format 1 from single PRB to multiple PRBs (n) with disabled frequency hopping. For example, FIG. 1 depicts an example enhancement of 2-symbol PUCCH format 0 from single PRB with enabled intra-slot frequency hopping to n contiguous PRBs 102 with disabled intra-slot frequency hopping.

Note that, if allowed by regulation, OCB can be met using frequency hopping as well, so that the combined bandwidth of PUCCH in two hops meets OCB requirement, while BW of each frequency hop can be less than OCB. In this case, each hop can have single PRB or more than one PRBs.

In one embodiment, Table 1 can be enhanced by providing additional parameters, which can either be pre-configured, or indicated by higher layer signaling (via MSI, RMSI or OSI), or can be implicitly derived in order to support contiguous allocation of n PRBs using PUCCH formats 0 and 1 for PUCCH resource set configuration before RRC connection setup. Example of such parameters are enlisted in table 2.

TABLE 2

Additional parameters to enhance PUCCH resource set configuration from single PRB in NR-licensed to multiple PRBs in NR-unlicensed using contiguous allocation (using PUCCH formats 0 and 1)

| Additional Parameters | Value |
|---|---|
| Number of PRBs (n) | n ≥ 12/6/3 for SCS = 15/30/60 KHz |
| Cyclic shift offset applied on n PRBs | $\Delta_{CS\text{-}offset}$ |
| Intra-slot frequency hopping | 0 (disabled) or 1 (enabled) |

$\Delta_{CS\text{-}offset}$ can either be a fixed offset, or a pattern of CS offsets which can be predefined in 3GPP specification, or configured via higher layer signaling or derived implicitly as a function of other parameters (e.g., PUCCH resource index, symbol/slot index etc.). Similarly, n can either be predefined, or can be configured by higher layer signaling, or can be a combination thereof (e.g., it can be predefined, but that value can be overwritten by higher layer signaling).

In another embodiment, the additional parameters mentioned above are incorporated in defining the parameters that are implicitly derived for PUCCH resource configuration during initial access, for example PRB index in the $1^{st}$ hop, PRB index in the $2^{nd}$ hop and initial CS index in the set of CS indexes. Since single PRB PUCCH resource (as in NR-licensed) is enhanced to multi-PRB in NR-unlicensed, PRB index of the $i^{th}$ PRB in the $1^{st}$ and $2^{nd}$ hops (when frequency hopping is enabled) can be redefined as:

PRB index ($1^{st}$ hop) =
$$\begin{cases} RB_{BWP}^{offset} + \lfloor r_{PUCCH}/N_{CS} \rfloor + (i-1), & \text{if } \lfloor r_{PUCCH}/8 \rfloor = 0 \\ N_{BWP}^{size} - 1 - RB_{BWP}^{offset} - \lfloor (r_{PUCCH}-8)/N_{CS} \rfloor - (i-1), & \text{otherwise} \end{cases}$$

PRB index ($2^{nd}$ hop) =
$$\begin{cases} RB_{BWP}^{offset} + \lfloor (r_{PUCCH}-8)/N_{CS} \rfloor + (i-1), & \text{if } \lfloor r_{PUCCH}/8 \rfloor = 1 \\ N_{BWP}^{size} - 1 - RB_{BWP}^{offset} - \lfloor r_{PUCCH}/N_{CS} \rfloor - (i-1), & \text{otherwise} \end{cases}$$

where, i=1, 2, ..., n. If frequency hopping is disabled, then the PRB indexes can be derived as:

PRB index ($i^{th}$ PRB)=$RB_{BWP}^{offset}$+$\lfloor r_{PUCCH}/N_{CS} \rfloor$+(i−1),i=1,2, ..., n Likewise, the CS index applied on the $i^{th}$ PRB can be defined as (initial CS index+$\Delta_{CS\text{-}offset,i}$) mod L, where $\Delta_{CS\text{-}offset,i}$ is the i-th element of an array of n different CS indexes either pre-defined in the spec, or configured via higher layer signaling, or implicitly derived as a function of other system parameters and L is the maximum allowed CS value (e.g., L=12). Alternatively, the CS index applied on the $i^{th}$ PRB can be defined as (initial CS index+i*$\Delta_{CS\text{-}offset}$) mod L, where i=1, 2, ..., n, L is the maximum allowed CS value and $\Delta_{CS\text{-}offset}$ is a fixed offset either pre-defined in the spec or is configured by higher layer signaling. Here, initial CS index can be derived similar to NR-licensed system, i.e.

from the set of initial CS indexes (last column of Table 1), the initial CS index is chosen as the j index within the set, where if frequency hopping is enabled, $$j = \begin{cases} r_{PUCCH} \bmod N_{CS}, & \text{if } \lfloor r_{PUCCH}/8 \rfloor = 0 \\ (r_{PUCCH}-8) \bmod N_{CS}, & \text{if } \lfloor r_{PUCCH}/8 \rfloor = 1 \end{cases}$$

And when frequency hopping is disabled, j=$r_{PUCCH}$ mod $N_{CS}$.

In another embodiment, other parameters in Table 1 can be modified, for example the first symbol and/or the number of symbols.

In another embodiment, the existing value(s) of PRB offset ($RB_{BWP}^{offset}$) can be modified, for example by scaling the existing values to n*existing value (where 0<n<1) or configuring new values that are not necessarily scaled version of the existing values, so as to make sure OCB requirement can be met. For example, the maximum value of PRB offset in Table 1, viz. $\lfloor NB_{BWP}^{size}/4 \rfloor$ can be reduced, when 80% OCB is mandated by regulation. For example, FIG. 2 depicts an example enhancement of 8-symbol PUCCH format 1 from single PRB with enabled intra-slot frequency hopping to n contiguous PRBs 202 (e.g. 3 PRBs) with disabled intra-slot frequency hopping.

Embodiment 1-2: Using PUCCH Formats 2 and 3

In another embodiment, PUCCH resource set before RRC connection set up can be configured using other inherent multi-PRB PUCCH formats from NR-licensed, i.e. PUCCH formats 2 and 3. Each of these formats can be configured with n PRBs mapped contiguously across frequency in order to meet OCB requirement, where $$n \geq \lceil \{(OCB/(12*SCS))\} \rceil$$

Note that, if allowed by regulation, OCB can be met using frequency hopping as well, so that the combined bandwidth of PUCCH in two hops meets OCB requirement, while BW of each frequency hop can be less than OCB. In this case, each hop can have single PRB or more than one PRBs. As one example, PUCCH format 4 (single-PRB format) with enabled frequency hopping can also be considered for PUCCH resource configuration.

Additionally, if PUCCH formats 2/3 are used for PUCCH resource configuration during initial access, some of the parameters may need to be revised, since those parameters may not be available during initial access. As one example, cell radio network temporary identifier (C-RNTI) is not available during initial access, which is used in Rel-15 as scrambling ID for initializing scrambling sequence for encoded UCI bits. So, instead of C-RNTI, TC-RNTI (temporary C-RNTI) available during initial access may be used as scrambling ID.

In one embodiment, the second column of Table 1 namely "PUCCH format" can be modified to configure PUCCH formats 2 and 3 replacing PUCCH formats 0 and 1. In addition, the last column of Table 1, i.e. "set of initial CS indexes" can be modified to "set of initial indexes", which can be time domain/frequency domain shift index for PUCCH formats 2/3. Note that, to enable time domain multiplexing, column 4 of Table 1 (number of symbols) may be modified such that the time shifted PUCCH resource does not cross the slot boundary. Additionally, PUCCH resources configured with PUCCH formats 2/3 may not always be aligned with the slot boundary.

In another embodiment, the parameters that are implicitly derived for PUCCH resource configuration during initial access, for example PRB index in the $1^{st}$ hop, PRB index in the $2^{nd}$ hop and initial shift index in the set of shift indexes, are enhanced to multi-PRB PUCCH resource configuration in NR-unlicensed. For example, $i^{th}$ PRB index in the $1^{st}$ and $2^{nd}$ hops (when frequency hopping is enabled) can be redefined as PRB index ($1^{st}$ hop) =

$$\begin{cases} RB_{BWP}^{offset} + \lfloor r_{PUCCH}/N_{CS} \rfloor + (i-1), & \text{if } \lfloor r_{PUCCH}/8 \rfloor = 0 \\ N_{BWP}^{size} - 1 - RB_{BWP}^{offset} - \lfloor (r_{PUCCH}-8)/N_{CS} \rfloor - (i-1), & \text{otherwise} \end{cases}$$

$$PRB \text{ indexes } (2^{nd} \text{ hop}) == \begin{cases} RB_{BWP}^{offset} + \lfloor (r_{PUCCH}-8)/N_{CS} \rfloor + (i-1), \\ \quad \text{if } \lfloor r_{PUCCH}/8 \rfloor = 1 \\ N_{BWP}^{size} - 1 - RB_{BWP}^{offset} - \lfloor \frac{r_{PUCCH}}{N_{CS}} \rfloor - (i-1), \\ \quad \text{otherwise} \end{cases}$$

Where, i=1, 2, . . . , n and $N_{CS}$ denotes total number of shift indexes which can be a time domain shift, or frequency domain shift. If frequency hopping is disabled, then the PRB indexes can be derived as:

PRB index ($i^{th}$ PRB)=$RB_{BWP}^{offset}$+$\lfloor r_{PUCCH}/N_{CS} \rfloor$+(i−1),i=1,2, . . . ,n Other modifications of Table 1 mentioned in the previous embodiment (using PUCCH formats 0/1), for example modification of the values of PRB offset, first symbol, number of symbols etc. and inclusion of parameters like number of PRBs (n), intra-slot frequency hopping etc. are also applicable here.

Embodiment 2: Enhancements to PUCCH Resource Sets Configuration During Initial Access with Non-Contiguous PRB Allocation Embodiment 2-1: Using PUCCH Formats 0 and 1

In embodiments, PUCCH resource set before RRC connection set up can be configured using existing PUCCH formats used in NR-licensed operation, i.e. PUCCH formats 0 and 1 which are inherently single-PRB (each PRB consisting of 12 sub-carriers) PUCCH formats. Both these single-PRB PUCCH formats can be enhanced to multiple PRBs (say, n PRBs, n≥2. Further, these n PRBs can be allocated non-contiguously in frequency (e.g., by using PRB based interlace), with inter-PRB distance m in between two consecutive PRBs such that OCB requirement is met.

[(n−1)*m+1]*(12*SCS)≥OCB

Figure 3:
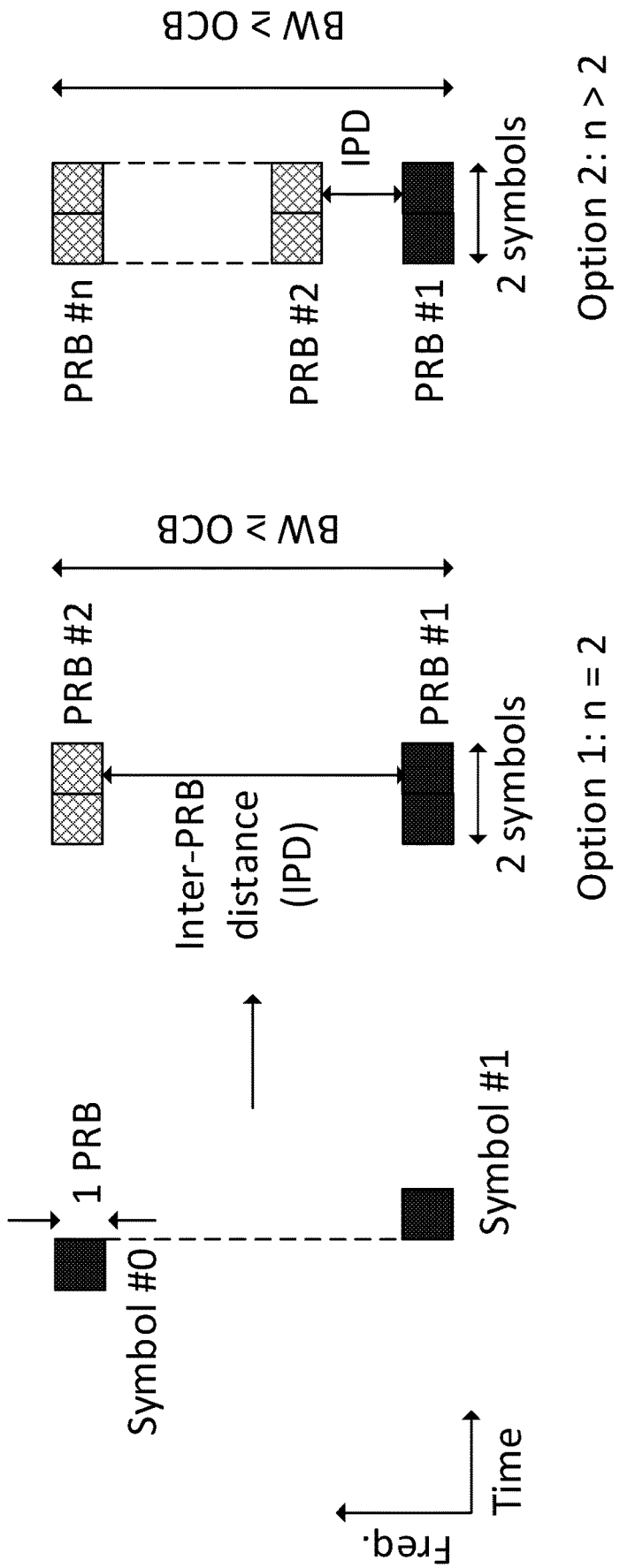
FIG. 3 depicts an example of using non-contiguous physical resource blocks (PRBs), in accordance with some embodiments.
Figure 4:
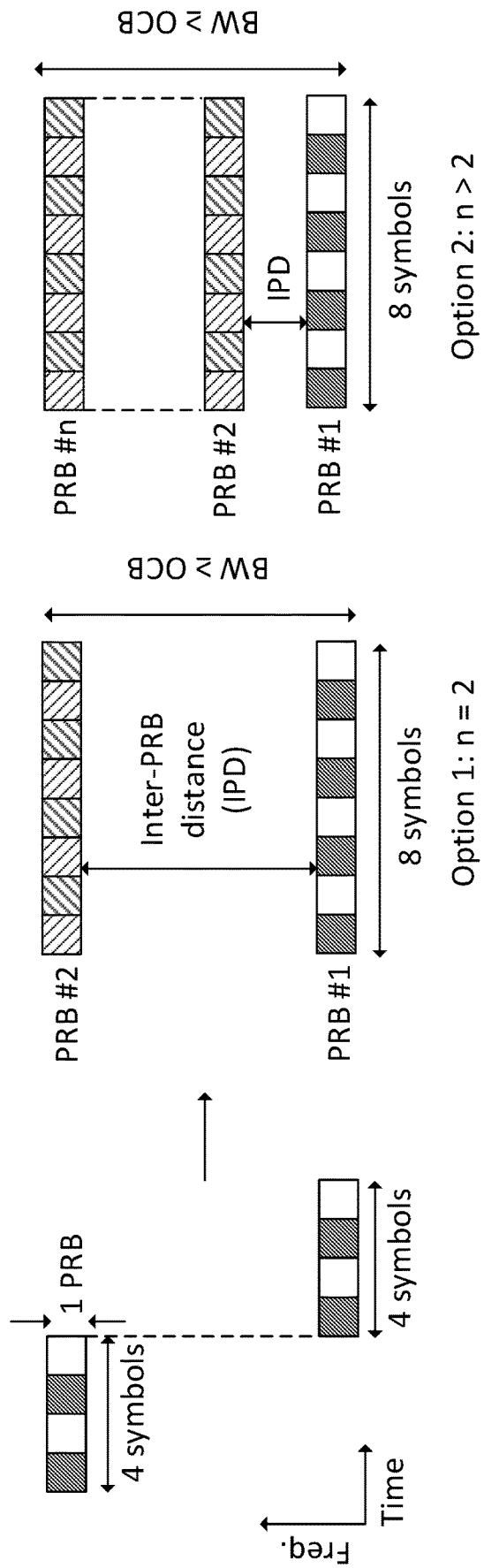
FIG. 4 depicts another example of using non-contiguous physical resource blocks (PRBs), in accordance with some embodiments.

Note that, an interlace-based design with number of PRBs per interlace, n=2 can be sufficient to meet OCB requirement by setting appropriate inter-PRB distance (m), while n>2 can be used in some cases as well, for example to boost transmission power by exploiting PSD regulation (e.g., 10 dBm/1 MHz) and setting inter-PRB distance (m) accordingly (e.g., m is such that 12*SCS (in MHz)*m>1 MHz). FIGS. 3 and 4 illustrate enhancements of PUCCH format 0 and PUCCH format 1 from single PRB to multiple PRBs (n) without frequency hopping. For example, FIG. 3 depicts an example enhancement of 2-symbol PUCCH format 0 from single PRB (with frequency hopping) to n non-contiguous PRBs (n=2 and n>2) without frequency hopping (legends shown in FIG. 1).

In one embodiment, Table 1 can be enhanced by providing additional parameters, which can either be pre-configured, or indicated by higher layer signaling (via MSI, RMSI or OSI), or can be implicitly derived in order to support non-contiguous allocation of n PRBs using PUCCH formats 0 and 1 for PUCCH resource set configuration before RRC connection setup. Examples of such parameters are enlisted in table 3.

TABLE 3

Additional parameters to enhance PUCCH resource set configuration from single PRB in NR-licensed to multi-PRB in NR-unlicensed using non-contiguous frequency allocation (using PUCCH formats 0 and 1)

| Additional Parameters | Value |
| --- | --- |
| Number of PRBs (n) | n ≥ 2 |
| Inter-PRB distance (m) | 12 * SCS (in MHz) * m > 1 MHz |
| Cyclic shift offset applied on n PRBs | $\Delta_{CS-offset}$ |
| Intra-slot frequency hopping | 0 (disabled) |

$\Delta_{CS-offset}$ can either be a fixed offset, or a pattern of CS offsets which can be predefined in specification, or configured via higher layer signaling or derived implicitly as a function of other parameters (e.g., PUCCH resource index, symbol/slot index etc.). Similarly, (n,m) can either be predefined, or can be configured by higher layer signaling, or can be a combination thereof (e.g., it can be predefined, but that value can be overwritten by higher layer signaling). Intra-slot frequency hopping can be disabled (in contrary to NR-licensed operation, where it is always enabled for PUCCH resource configuration during initial access) since frequency diversity can be already be achieved by non-contiguous frequency allocation.

In another embodiment, some implicitly derived PUCCH resource parameters in NR-licensed, such as PRB index of the $1^{st}$ and $2^{nd}$ hops can be repurposed to support PUCCH resource configuration with interlace-based PRB allocation in NR-unlicensed. For example, with n=2 and intra-slot frequency hopping disabled, PRB index of the $1^{st}$ and $2^{nd}$ PRBs can be implicitly derived instead of PRB indexes of $1^{st}$ and $2^{nd}$ hops. As one example, PRB index ($1^{st}$ PRB)=$\lfloor r_{PUCCH}/N_{CS} \rfloor$ PRB index ($2^{nd}$ PRB)=$N_{BWP}^{size}$−1−$\lfloor ((r_{PUCCH,max}-r_{PUCCH})/N_{CS}) \rfloor$ Alternatively, PRB index of the $2^{nd}$ PRB can be derived as PRB index ($2^{nd}$ PRB)=$N_{BWP}^{size}$−1−$\lfloor r_{PUCCH}/N_{CS} \rfloor$.

More generally, PRB index of the $2^{nd}$ PRB can be selected as an offset from the PRB index of the $1^{st}$ PRB, while the offset is IPD (as mentioned earlier) and the existing parameter $RB_{BWP}^{offset}$ is revised to indicate IPD (m) of the interlace based structure. Then, PRB index ($2^{nd}$ PRB)=PRB index ($1^{st}$ PRB)+($RB_{BWP}^{offset}$+1).

In general, when n>2, PRB index of the $1^{st}$ PRB can be derived as mentioned above and the PRB index of $i^{th}$ PRB of the interlace can be derived as PRB index ($i^{th}$ PRB)=PRB index ($1^{st}$ PRB)+{($RB_{BWP}^{offset}$+1)*(i−1)}

Where, $RB_{BWP}^{offset}$ is the inter-PRB distance and i=1, 2, 3, . . . , n. Likewise, the CS index applied on the $i^{th}$ PRB can be defined as (initial CS index+$\Delta_{CS-offset,i}$) mod L, where $\Delta_{CS\text{-}offset,i}$ is the i-th element of an array of n different CS indexes either pre-defined in the spec, or configured via higher layer signaling, or implicitly derived as a function of other system parameters and L is the maximum allowed CS value (e.g., L=12). Alternatively, the CS index applied on the $i^{th}$ PRB can be defined as (initial CS index+$i*\Delta_{CS\text{-}offset}$) mod L, where i=1, 2, ..., n, L is the maximum allowed CS value and $\Delta_{CS\text{-}offset}$ is a fixed offset either pre-defined in the spec or is configured by higher layer signaling. Here, initial CS index can be derived similar to NR-licensed system, i.e. from the set of initial CS indexes (last column of Table 1), the initial CS index is chosen as the $j^{th}$ index within the set, where $j = r_{PUCCH}$ mod $N_{CS}$.

In another embodiment, the existing value(s) of PRB offset ($RB_{BWP}^{offset}$) can be modified so as to make sure OCB requirement can be met. For example, the maximum value of PRB offset in Table 1, viz. $\lfloor N_{BWP}^{size}/4 \rfloor$ can be reduced, when 80% OCB is mandated by regulation. For example, FIG. 4 depicts an example enhancement of 8-symbol PUCCH format 1 from single PRB (with frequency hopping) to n non-contiguous PRBs (n=2 and n>2) without frequency hopping (legends shown in FIG. 2).

Embodiment 2-2: Using PUCCH Formats 2 and 3

In embodiments, PUCCH resource set before RRC connection set up can be configured using other PUCCH formats from NR-licensed, i.e. PUCCH formats 2 and 3. Each of these formats can be configured with n PRBs mapped non-contiguously across frequency (e.g., using PRB based interlace using n≥2), with inter-PRB distance m in between two consecutive PRBs such that OCB requirement is met.

$$[(n-1)*m+1]*(12*SCS) \geq OCB$$

Note that, an interlace-based design with number of PRBs per interlace, n=2 can be sufficient to meet OCB requirement by setting appropriate inter-PRB distance (m), while n>2 can be used in some cases as well, for example to boost transmission power by exploiting PSD regulation (e.g., 10 dBm/1 MHz) and setting inter-PRB distance (m) accordingly (e.g., m is such that 12*SCS (in MHz)*m>1 MHz).

In one embodiment, the second column of Table 1 namely "PUCCH format" can be modified to configure PUCCH formats 2 and 3 replacing PUCCH formats 0 and 1. In addition, the last column of Table 1, i.e. "set of initial CS indexes" can be modified to "set of initial indexes", which can be time domain/frequency domain shift index for PUCCH formats 2/3. Note that, to enable time domain multiplexing, column 4 of Table 1 (Number of symbols) may be modified such that the time shifted PUCCH resource does not cross the slot boundary. Additionally, PUCCH resources configured with PUCCH formats 2/3 may not be always aligned with the slot boundary.

Additionally, Table 1 can be enhanced by providing additional parameters, which can either be pre-configured, or indicated by higher layer signaling (via MSI, RMSI or OSI), or can be implicitly derived in order to support non-contiguous allocation of n PRBs using PUCCH formats 2 and 3 for PUCCH resource set configuration before RRC connection setup. Examples of such parameters are enlisted in table 4.

TABLE 4

Additional parameters to enhance PUCCH resource set configuration from single PRB in NR-licensed to multiple PRBs in NR-unlicensed using non-contiguous allocation (using PUCCH formats 2 and 3)

| Additional Parameters | Value |
| --- | --- |
| Number of PRBs (n) | n ≥ 2 |
| Inter-PRB distance (m) | 12 * SCS (in MHz) * m > 1 MHz |
| Intra-slot frequency hopping | 0 (disabled) |

Intra-slot frequency hopping can be disabled (in contrary to NR-licensed operation, where it is always enabled for PUCCH resource configuration during initial access) since frequency diversity can be already be achieved by non-contiguous frequency allocation.

In another embodiment, some implicitly derived PUCCH resource parameters in NR-licensed, such as PRB index of the $1^{st}$ and $2^{nd}$ hops can be repurposed to support PUCCH resource configuration with interlace-based PRB allocation in NR-unlicensed. For example, with n=2 and intra-slot frequency hopping disabled, PRB index of the $1^{st}$ and $2^{nd}$ PRBs can be implicitly derived instead of PRB indexes of $1^{st}$ and $2^{nd}$ hops. As one example, PRB index ($1^{st}$ PRB)=$\lfloor r_{PUCCH}/N_{CS} \rfloor$ PRB index ($2^{nd}$ PRB)=$N_{BWP}^{size}-1-\lfloor ((r_{PUCCH,max}-r_{PUCCH})/N_{CS}) \rfloor$ Alternatively, PRB index of the $2^{nd}$ PRB can be derived as PRB index ($2^{nd}$ PRB)=$N_{BWP}^{size}-1-\lfloor r_{PUCCH}/N_{CS} \rfloor$.

More generally, PRB index of the $2^{nd}$ PRB can be selected as an offset from the PRB index of the $1^{st}$ PRB, while the offset is IPD (as mentioned earlier) and the existing parameter $RB_{BWP}^{offset}$ revised to indicate IPD (m) of the interlace based structure. Then, PRB index ($2^{nd}$ PRB)=PRB index ($1^{st}$ PRB)+ ($RB_{BWP}^{offset}+1$)

In general, when n>2, PRB index of the $1^{st}$ PRB can be derived as mentioned above and the PRB index of $i^{th}$ PRB of the interlace can be derived as PRB index ($i^{th}$ PRB)=PRB index ($1^{st}$ PRB)+ $\{(RB_{BWP}^{offset}+1)*(i-1)\}$ Where, $RB_{BWP}^{offset}$ is the inter-PRB distance and i=1, 2, 3, ..., n and $N_{CS}$ denotes total number of shift indexes which can be a time domain shift, or frequency domain index. Other modifications of Table 1 mentioned in the previous embodiment (using PUCCH formats 0/1), for example modification of the values of PRB offset etc. are also applicable here.

Note that, the above embodiments related to non-contiguous frequency allocation may also be applicable if frequency hopping is enabled. If frequency hopping is enabled, PRB indices of the $1^{st}$ hop and $2^{nd}$ hop would be additionally derived.

Enhancement of PUCCH Resource Configuration to Allow Multiple Time Domain Opportunities In one embodiment, multiple first symbols in a slot can also be defined corresponding to one row in the table (Table 1), so that listen-before-talk (LBT) congestion can be alleviated and depending on LBT outcome, UE can choose a first symbol for PUCCH transmission. Further, UE can apply puncturing or rate matching as appropriate. Alternatively, the last symbol of PUCCH is always aligned with slot boundary, i.e., when the first symbol is determined, the length of PUCCH transmission is also determined.

As an alternative, multiple slot opportunities can be configured for PUCCH transmission. In particular, a PUCCH transmission window can be defined wherein the window size can be configured via RMSI. In this case, UE may transmit the PUCCH starting from the indicated slot. If the LBT fails, UE may continue to try the next available UL slot for PUCCH transmission until the last slot in the window is reached. Note that in each slot, the same starting symbol is used for PUCCH transmission. In this case, the current starting symbol in the table can be maintained. Note that, this embodiment is applicable irrespective of PUCCH formats used for resource configuration and applicable to both contiguous and non-contiguous frequency allocations.

General Enhancements to Various PUCCH Formats for Configuring PUCCH Resource Sets During Initial Access For enhancement of PUCCH format 0 from single PRB to n PRBs (contiguous or non-contiguous or a combination thereof, where n≥2)), In one embodiment, the same length-12 base sequence can be mapped on n PRBs by applying n cyclic shifts. In particular, different cyclic shifts can be applied on different PRBs. The cyclic shift pattern in different PRBs can be predefined in the specification or configured by higher layer, e.g., via NR minimum system information (MSI), NR remaining minimum system information (RMSI) or NR other system information (OSI). Alternatively, the cyclic shift pattern in different PRBs can be defined as a function of PUCCH resource index, symbol/slot index, etc. In one embodiment, a constant cyclic shift offset can be applied on different PRBs.

In another embodiment, the same length-12 sequence (with the same cyclic shift) can be repeatedly mapped on n PRBs by applying additional phase offsets on each of these repetitions. The phase offsets can be predefined in the specification or randomly selected by UE or configured by higher layers via MSI, RMSI or OSI.

In another embodiment, different base sequences (with cyclic shift hopping and/or base sequence hopping being applied) can be mapped on n PRBs. Additional phase offsets may be applied on these n different base sequences.

Additionally, PUCCH format 0 can be enhanced from single PRB to n PRBs by mapping length-l low PAPR (peak-to-average power ratio) sequence (for example, Zadoff-Chu (ZC) sequence or computer generated sequence (CGS)) (where, l=m*12, m can be an integer and 1<m≤n) and mapped across n PRBs using similar embodiments (e.g., ⌈n/m⌉ different CS shifts/phase-offsets/base sequence with CS and/or base sequence hopping etc.) as mentioned above.

For enhancement of PUCCH format 1 from single PRB to n PRBs (contiguous or non-contiguous or a combination thereof, where n≥2)). In one embodiment, DMRS and UCI sequences can be mapped n times across frequency by applying n cyclic shifts. The cyclic shifts applied on DMRS sequences may be different than that applied on UCI sequences. For example, if n denotes the cyclic shift applied on DMRS sequences, the cyclic shift applied on UCI sequences may be $n_{UCI}$, where $n_{UCI}=(n+\nabla_{offset})\bmod 12$, and where $\nabla_{offset}$ is pre-configured or provided by higher layer signaling via MSI, RMSI or OSI.

In another embodiment, the same DMRS and UCI sequences can be repeatedly mapped on n PRBs by applying additional phase offsets on each of these repetitions. The phase offsets applied on DMRS sequences may be different than that applied on UCI sequences.

In another embodiment, different base sequences (with cyclic shift hopping and/or base sequence hopping being applied) can be used for DMRS and spreading sequence of UCI to generate each of the n copies of PUCCH format 1, to be mapped on n PRBs. Additional phase offsets may be applied on these n different copies of PUCCH format 1, where the phase offsets applied on DMRS sequences may be different than that applied on UCI sequences.

Additionally, PUCCH format 1 can be enhanced from single PRB to n PRBs by using length-l low PAPR (peak-to-average power ratio) sequence (for example, Zadoff-Chu (ZC) sequence or computer generated sequence (CGS)) (where, l=m*12, m can be an integer and 1<m≤n) for DMRS and spreading sequence of UCI, and mapped across n PRBs using similar embodiments (e.g., ⌈n/m⌉ different CS shifts/phase-offsets/base sequence with CS and/or base sequence hopping etc.) as mentioned above.

For enhancement of PUCCH formats 2 and 3 to support UCI payload of <2 bits. In one embodiment, repetition or simplex coding scheme can be used to support encoding of 1~2 UCI bit(s). In another embodiment, zero padding can be used to increase the payload size to 3 bits and then the existing NR PUCCH format 2/3 encoding scheme for >2 UCI bits can be used.

In one embodiment, applying OCC can be an additional dimension to further randomize interference for PUCCH formats 0/2. E.g., for enhanced PUCCH format 0 with 2 symbols, length-2 OCC could be applied. The applied OCC index can be bound to cyclic shifts.

In another embodiment, new short and long PUCCH formats can be defined for interlace based (i.e. non-contiguous) frequency allocation of PUCCH resource configuration before initial access. While the short PUCCH format can be based on NR PUCCH formats 0/2 and the long PUCCH format can be based on NR PUCCH formats 1/3/4, the new formats designed for interlace based frequency allocation may have additional features. As one example, PUCCH formats 0/2 in NR could be extended to have more than 2 symbols (while PUCCH formats 0/2 in NR are restricted to maximum 2 symbols). Similarly, the new long PUCCH format spanning over more than 1 PRBs may have per PRB different OCCs applied over the multiple symbols for interference randomization.

Systems and Implementations

Figure 5:
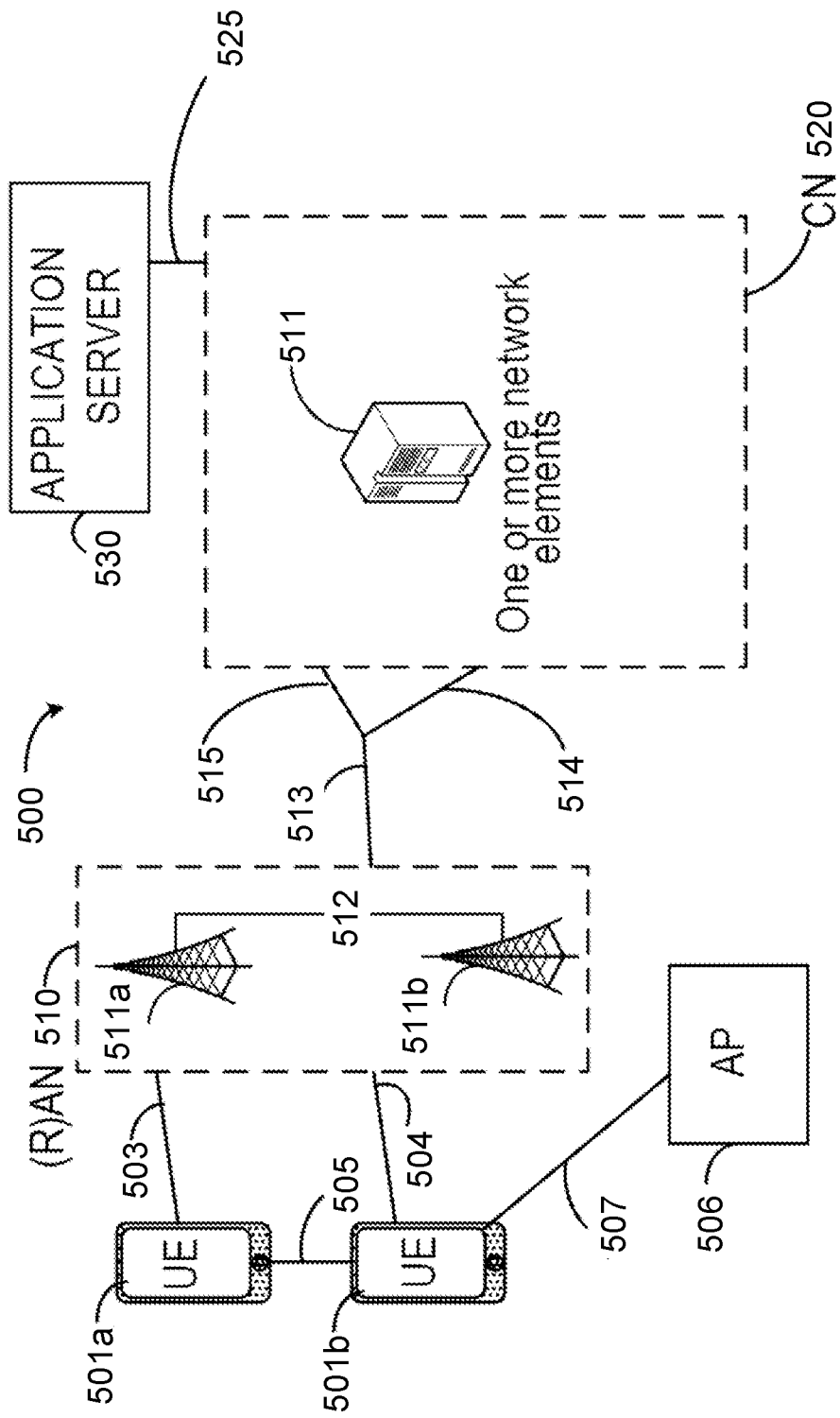
FIG. 5 illustrates an example system architecture, in accordance with some embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 501a and UE 501b (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501b is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501b, RAN 510, and AP 506 may be configured to utilize LWA operation and/or LWIP operation. The LWA operation may involve the UE 501b in RRC_CONNECTED being configured by a RAN node 511a-b to utilize radio resources of LTE and WLAN. LWIP operation may involve the UE 501b using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 7), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5GC (e.g., CN 640 of FIG. 6B) via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501a, 501b and the RAN nodes 511a, 511b communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501a, 501b and the RAN nodes 511a, 511b may operate using LAA, eLAA, and/or feLAA mechanisms. In these implementations, the UEs 501a, 501b and the RAN nodes 511a, 511b may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501a, 501b, RAN nodes 511a, 511b, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501a or 501b, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501a, 501b to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system (e.g., when CN 520 is an EPC 620 as in FIG. 6A), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 520 is an 5GC 640 as in FIG. 6B), the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the SI control plane (NG-C) interface 515, which is a signaling interface between the RAN nodes 511 and AMFs. Embodiments where the CN 520 is a 5GC 520 are discussed in more detail with regard to FIG. 6B.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an SI interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs. An example architecture wherein the CN 520 is an EPC 520 is shown by FIG. 6A.

Figure 6A:
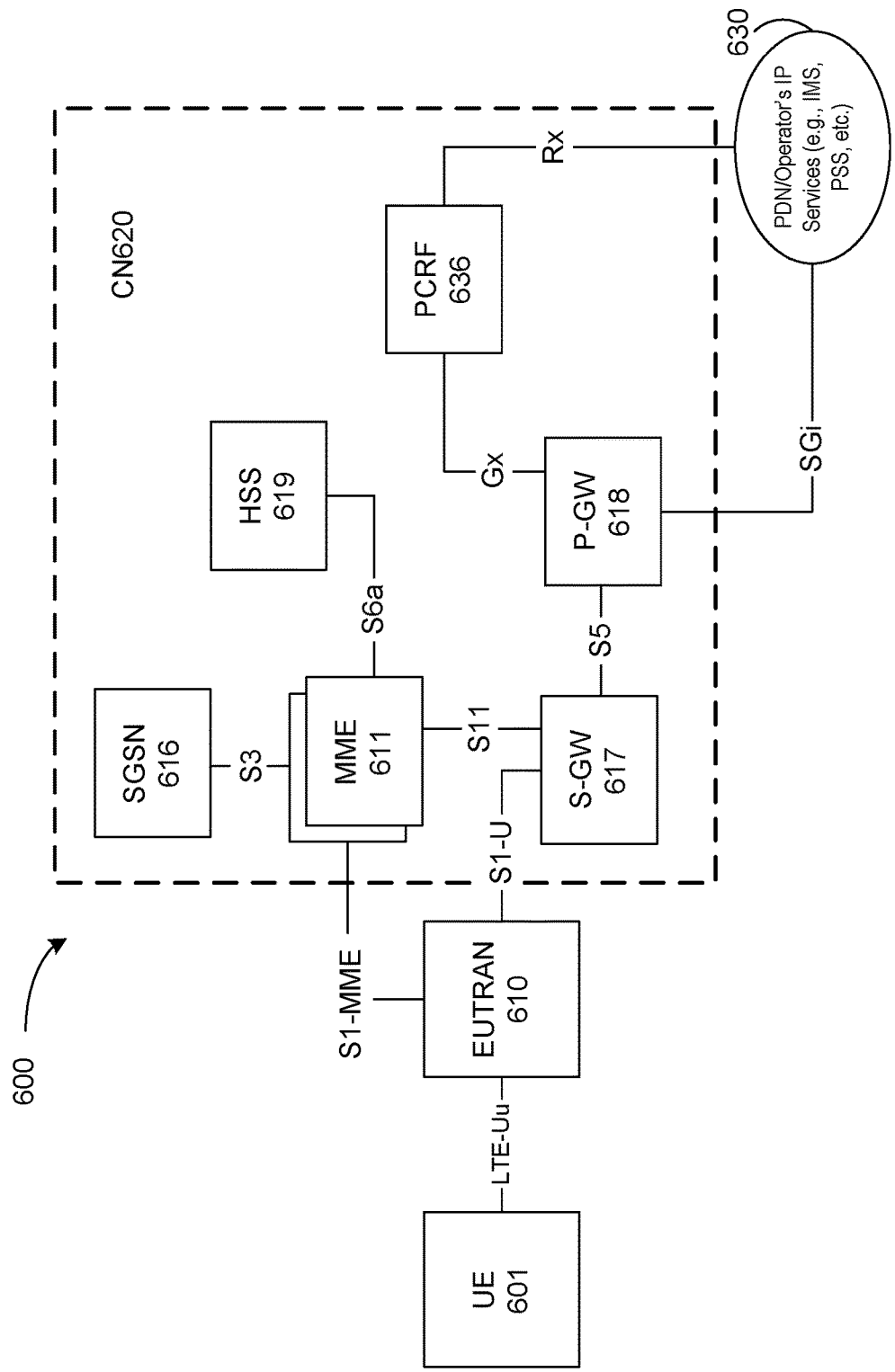
FIG. 6A depicts an architecture of a system including a first core network in accordance with some embodiments.

FIG. 6A illustrates an example architecture of a system 600 including a first CN 620, in accordance with various embodiments. In this example, system 600 may implement the LTE standard wherein the CN 620 is an EPC 620 that corresponds with CN 520 of FIG. 5. Additionally, the UE 601 may be the same or similar as the UEs 501 of FIG. 5, and the E-UTRAN 610 may be a RAN that is the same or similar to the RAN 510 of FIG. 5, and which may include RAN nodes 511 discussed previously. The CN 620 may comprise MMEs 611, an S-GW 617, a P-GW 618, a HSS 619, and a SGSN 616.

The MMEs 611 may be similar in function to the control plane of legacy SGSN, and may implement MM functions to keep track of the current location of a UE 601. The MMEs 611 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 601, provide user identity confidentiality, and/or perform other like services to users/subscribers. Each UE 601 and the MME 611 may include an MM or EMM sublayer, and an MM context may be established in the UE 601 and the MME 611 when an attach procedure is successfully completed. The MM context may be a data structure or database object that stores MM-related information of the UE 601. The MMEs 611 may be coupled with the HSS 619 via an S6a reference point, coupled with the SGSN 616 via an S3 reference point, and coupled with the S-GW 617 via an S11 reference point.

The SGSN 616 may be a node that serves the UE 601 by tracking the location of an individual UE 601 and performing security functions. In addition, the SGSN 616 may perform Inter-EPC node signaling for mobility between 2G/3G and E-UTRAN 3GPP access networks; PDN and S-GW selection as specified by the MMEs 611; handling of UE 601 time zone functions as specified by the MMEs 611; and MME selection for handovers to E-UTRAN 3GPP access network. The S3 reference point between the MMEs 611 and the SGSN 616 may enable user and bearer information exchange for inter-3GPP access network mobility in idle and/or active states.

The HSS 619 may comprise a database for network users, including subscription-related information to support the network entities' handling of communication sessions. The EPC 620 may comprise one or several HSSs 619, depending on the number of mobile subscribers, on the capacity of the equipment, on the organization of the network, etc. For example, the HSS 619 can provide support for routing/roaming, authentication, authorization, naming/addressing resolution, location dependencies, etc. An S6a reference point between the HSS 619 and the MMEs 611 may enable transfer of subscription and authentication data for authenticating/authorizing user access to the EPC 620 between HSS 619 and the MMEs 611.

The S-GW 617 may terminate the S1 interface 513 ("S1-U" in FIG. 6A) toward the RAN 610, and routes data packets between the RAN 610 and the EPC 620. In addition, the S-GW 617 may be a local mobility anchor point for inter-RAN node handovers and also may provide an anchor for inter-3GPP mobility. Other responsibilities may include lawful intercept, charging, and some policy enforcement. The S11 reference point between the S-GW 617 and the MMEs 611 may provide a control plane between the MMEs 611 and the S-GW 617. The S-GW 617 may be coupled with the P-GW 618 via an S5 reference point.

The P-GW 618 may terminate an SGi interface toward a PDN 630. The P-GW 618 may route data packets between the EPC 620 and external networks such as a network including the application server 530 (alternatively referred to as an "AF") via an IP interface 525 (see e.g., FIG. 5). In embodiments, the P-GW 618 may be communicatively coupled to an application server (application server 530 of FIG. 5 or PDN 630 in FIG. 6A) via an IP communications interface 525 (see, e.g., FIG. 5). The S5 reference point between the P-GW 618 and the S-GW 617 may provide user plane tunneling and tunnel management between the P-GW 618 and the S-GW 617. The S5 reference point may also be used for S-GW 617 relocation due to UE 601 mobility and if the S-GW 617 needs to connect to a non-collocated P-GW 618 for the required PDN connectivity. The P-GW 618 may further include a node for policy enforcement and charging data collection (e.g., PCEF (not shown)). Additionally, the SGi reference point between the P-GW 618 and the packet data network (PDN) 630 may be an operator external public, a private PDN, or an intra operator packet data network, for example, for provision of IMS services. The P-GW 618 may be coupled with a PCRF 636 via a Gx reference point.

PCRF 636 is the policy and charging control element of the EPC 620. In a non-roaming scenario, there may be a single PCRF 636 in the Home Public Land Mobile Network (HPLMN) associated with a UE 601's Internet Protocol Connectivity Access Network (IP-CAN) session. In a roaming scenario with local breakout of traffic, there may be two PCRFs associated with a UE 601's IP-CAN session, a Home PCRF (H-PCRF) within an HPLMN and a Visited PCRF (V-PCRF) within a Visited Public Land Mobile Network (VPLMN). The PCRF 636 may be communicatively coupled to the application server 630 via the P-GW 618. The application server 630 may signal the PCRF 636 to indicate a new service flow and select the appropriate QoS and charging parameters. The PCRF 636 may provision this rule into a PCEF (not shown) with the appropriate TFT and QCI, which commences the QoS and charging as specified by the application server 630. The Gx reference point between the PCRF 636 and the P-GW 618 may allow for the transfer of QoS policy and charging rules from the PCRF 636 to PCEF in the P-GW 618. An Rx reference point may reside between the PDN 630 (or "AF 630") and the PCRF 636.

Figure 6B:
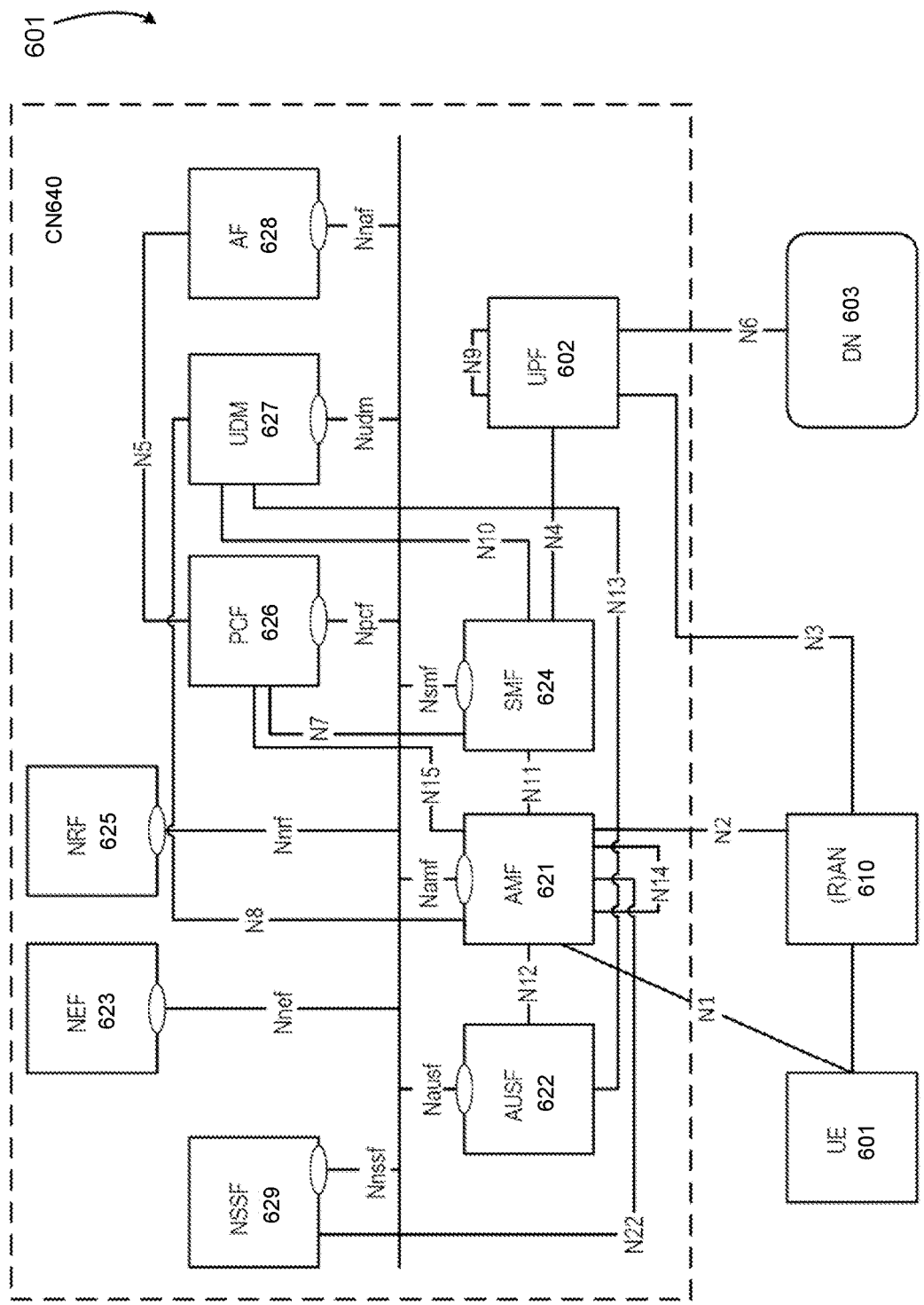
FIG. 6B depicts an architecture of a system including a second core network in accordance with some embodiments.

FIG. 6B illustrates an architecture of a system 601 including a second CN 640 in accordance with various embodiments. The system 601 is shown to include a UE 601, which may be the same or similar to the UEs 501 and UE 601 discussed previously; a (R)AN 610, which may be the same or similar to the RAN 510 and RAN 610 discussed previously, and which may include RAN nodes 511 discussed previously; and a DN 603, which may be, for example, operator services, Internet access or 3rd party services; and a 5GC 640. The 5GC 640 may include an AUSF 622; an AMF 621; a SMF 624; a NEF 623; a PCF 626; a NRF 625; a UDM 627; an AF 628; a UPF 602; and a NSSF 629.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 602 may include an uplink classifier to support routing traffic flows to a data network. The DN 603 may represent various network operator services, Internet access, or third party services. DN 603 may include, or be similar to, application server 530 discussed previously. The UPF 602 may interact with the SMF 624 via an N4 reference point between the SMF 624 and the UPF 602.

The AUSF 622 may store data for authentication of UE 601 and handle authentication-related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 may be responsible for registration management (e.g., for registering UE 601, etc.), connection management, reachability management, mobility management, and lawful interception of AMF-related events, and access authentication and authorization. The AMF 621 may be a termination point for the an N11 reference point between the AMF 621 and the SMF 624. The AMF 621 may provide transport for SM messages between the UE 601 and the SMF 624, and act as a transparent pro11 for routing SM messages. AMF 621 may also provide transport for SMS messages between UE 601 and an SMSF (not shown by FIG. 6B). AMF 621 may act as SEAF, which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a SCM function, which receives a key from the SEA that it uses to derive access-network specific keys. Furthermore, AMF 621 may be a termination point of a RAN CP interface, which may include or be an N2 reference point between the (R)AN 610 and the AMF 621; and the AMF 621 may be a termination point of NAS (N1) signalling, and perform NAS ciphering and integrity protection.

AMF 621 may also support NAS signalling with a UE 601 over an N3 IWF interface. The N3IWF may be used to provide access to untrusted entities. N3IWF may be a termination point for the N2 interface between the (R)AN 610 and the AMF 621 for the control plane, and may be a termination point for the N3 reference point between the (R)AN 610 and the UPF 602 for the user plane. As such, the AMF 621 may handle N2 signalling from the SMF 624 and the AMF 621 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 621 and an N17 reference point between the AMF 621 and a 5G-EIR (not shown by FIG. 6B).

The UE 601 may need to register with the AMF 621 in order to receive network services. RM is used to register or deregister the UE 601 with the network (e.g., AMF 621), and establish a UE context in the network (e.g., AMF 621). The UE 601 may operate in an RM-REGISTERED state or an RM-DEREGISTERED state. In the RM-DEREGISTERED state, the UE 601 is not registered with the network, and the UE context in AMF 621 holds no valid location or routing information for the UE 601 so the UE 601 is not reachable by the AMF 621. In the RM-REGISTERED state, the UE 601 is registered with the network, and the UE context in AMF 621 may hold a valid location or routing information for the UE 601 so the UE 601 is reachable by the AMF 621. In the RM-REGISTERED state, the UE 601 may perform mobility Registration Update procedures, perform periodic Registration Update procedures triggered by expiration of the periodic update timer (e.g., to notify the network that the UE 601 is still active), and perform a Registration Update procedure to update UE capability information or to re-negotiate protocol parameters with the network, among others.

The AMF 621 may store one or more RM contexts for the UE 601, where each RM context is associated with a specific access to the network. The RM context may be a data structure, database object, etc. that indicates or stores, inter alia, a registration state per access type and the periodic update timer. The AMF 621 may also store a 5GC MM context that may be the same or similar to the (E)MM context discussed previously. In various embodiments, the AMF 621 may store a CE mode B Restriction parameter of the UE 601 in an associated MM context or RM context. The AMF 621 may also derive the value, when needed, from the UE's usage setting parameter already stored in the UE context (and/or MM/RM context).

CM may be used to establish and release a signaling connection between the UE 601 and the AMF 621 over the N1 interface. The signaling connection is used to enable NAS signaling exchange between the UE 601 and the CN 640, and comprises both the signaling connection between the UE and the AN (e.g., RRC connection or UE-N3IWF connection for non-3GPP access) and the N2 connection for the UE 601 between the AN (e.g., RAN 610) and the AMF 621. The UE 601 may operate in one of two CM states, CM-IDLE mode or CM-CONNECTED mode. When the UE 601 is operating in the CM-IDLE state/mode, the UE 601 may have no NAS signaling connection established with the AMF 621 over the N1 interface, and there may be (R)AN 610 signaling connection (e.g., N2 and/or N3 connections) for the UE 601. When the UE 601 is operating in the CM-CONNECTED state/mode, the UE 601 may have an established NAS signaling connection with the AMF 621 over the N1 interface, and there may be a (R)AN 610 signaling connection (e.g., N2 and/or N3 connections) for the UE 601. Establishment of an N2 connection between the (R)AN 610 and the AMF 621 may cause the UE 601 to transition from CM-IDLE mode to CM-CONNECTED mode, and the UE 601 may transition from the CM-CONNECTED mode to the CM-IDLE mode when N2 signaling between the (R)AN 610 and the AMF 621 is released.

The SMF 624 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 601 and a data network (DN) 603 identified by a Data Network Name (DNN). PDU sessions may be established upon UE 601 request, modified upon UE 601 and 5GC 640 request, and released upon UE 601 and 5GC 640 request using NAS SM signaling exchanged over the N1 reference point between the UE 601 and the SMF 624. Upon request from an application server, the 5GC 640 may trigger a specific application in the UE 601. In response to receipt of the trigger message, the UE 601 may pass the trigger message (or relevant parts/information of the trigger message) to one or more identified applications in the UE 601. The identified application(s) in the UE 601 may establish a PDU session to a specific DNN. The SMF 624 may check whether the UE 601 requests are compliant with user subscription information associated with the UE 601. In this regard, the SMF 624 may retrieve and/or request to receive update notifications on SMF 624 level subscription data from the UDM 627.

The SMF 624 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 624 may be included in the system 601, which may be between another SMF 624 in a visited network and the SMF 624 in the home network in roaming scenarios. Additionally, the SMF 624 may exhibit the Nsmf service-based interface.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using standardized interfaces. The stored information can then be re-exposed by the NEF 623 to other NFs and AFs, and/or used for other purposes such as analytics. Additionally, the NEF 623 may exhibit an Nnef service-based interface.

The NRF 625 may support service discovery functions, receive NF discovery requests from NF instances, and provide the information of the discovered NF instances to the NF instances. NRF 625 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 625 may exhibit the Nnrf service-based interface.

The PCF 626 may provide policy rules to control plane function(s) to enforce them, and may also support unified policy framework to govern network behaviour. The PCF 626 may also implement an FE to access subscription information relevant for policy decisions in a UDR of the UDM 627. The PCF 626 may communicate with the AMF 621 via an N15 reference point between the PCF 626 and the AMF 621, which may include a PCF 626 in a visited network and the AMF 621 in case of roaming scenarios. The PCF 626 may communicate with the AF 628 via an N5 reference point between the PCF 626 and the AF 628; and with the SMF 624 via an N7 reference point between the PCF 626 and the SMF 624. The system 601 and/or CN 640 may also include an N24 reference point between the PCF 626 (in the home network) and a PCF 626 in a visited network. Additionally, the PCF 626 may exhibit an Npcf service-based interface.

The UDM 627 may handle subscription-related information to support the network entities' handling of communication sessions, and may store subscription data of UE 601. For example, subscription data may be communicated between the UDM 627 and the AMF 621 via an N8 reference point between the UDM 627 and the AMF. The UDM 627 may include two parts, an application FE and a UDR (the FE and UDR are not shown by FIG. 6B). The UDR may store subscription data and policy data for the UDM 627 and the PCF 626, and/or structured data for exposure and application data (including PFDs for application detection, application request information for multiple UEs 601) for the NEF 623. The Nudr service-based interface may be exhibited by the UDR 221 to allow the UDM 627, PCF 626, and NEF 623 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 624 via an N10 reference point between the UDM 627 and the SMF 624. UDM 627 may also support SMS management, wherein an SMS-FE implements the similar application logic as discussed previously. Additionally, the UDM 627 may exhibit the Nudm service-based interface.

The AF 628 may provide application influence on traffic routing, provide access to the NCE, and interact with the policy framework for policy control. The NCE may be a mechanism that allows the 5GC 640 and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs. Additionally, the AF 628 may exhibit an Naf service-based interface.

The NSSF 629 may select a set of network slice instances serving the UE 601. The NSSF 629 may also determine allowed NSSAI and the mapping to the subscribed S-NSSAIs, if needed. The NSSF 629 may also determine the AMF set to be used to serve the UE 601, or a list of candidate AMF(s) 621 based on a suitable configuration and possibly by querying the NRF 625. The selection of a set of network slice instances for the UE 601 may be triggered by the AMF 621 with which the UE 601 is registered by interacting with the NSSF 629, which may lead to a change of AMF 621. The NSSF 629 may interact with the AMF 621 via an N22 reference point between AMF 621 and NSSF 629; and may communicate with another NSSF 629 in a visited network via an N31 reference point (not shown by FIG. 6B). Additionally, the NSSF 629 may exhibit an Nnssf service-based interface.

As discussed previously, the CN 640 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for a notification procedure that the UE 601 is available for SMS transfer (e.g., set a UE not reachable flag, and notifying UDM 627 when UE 601 is available for SMS).

The CN 640 may also include other elements that are not shown by FIG. 6B, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 6B). Individual NFs may share a UDSF for storing their respective unstructured data or individual NFs may each have their own UDSF located at or near the individual NFs. Additionally, the UDSF may exhibit an Nudsf service-based interface (not shown by FIG. 6B). The 5G-EIR may be an NF that checks the status of PEI for determining whether particular equipment/entities are blacklisted from the network; and the SEPP may be a non-transparent pro11 that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 6B for clarity. In one example, the CN 640 may include an Nx interface, which is an inter-CN interface between the MME (e.g., MME 611) and the AMF 621 in order to enable interworking between CN 640 and CN 620. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 7A:
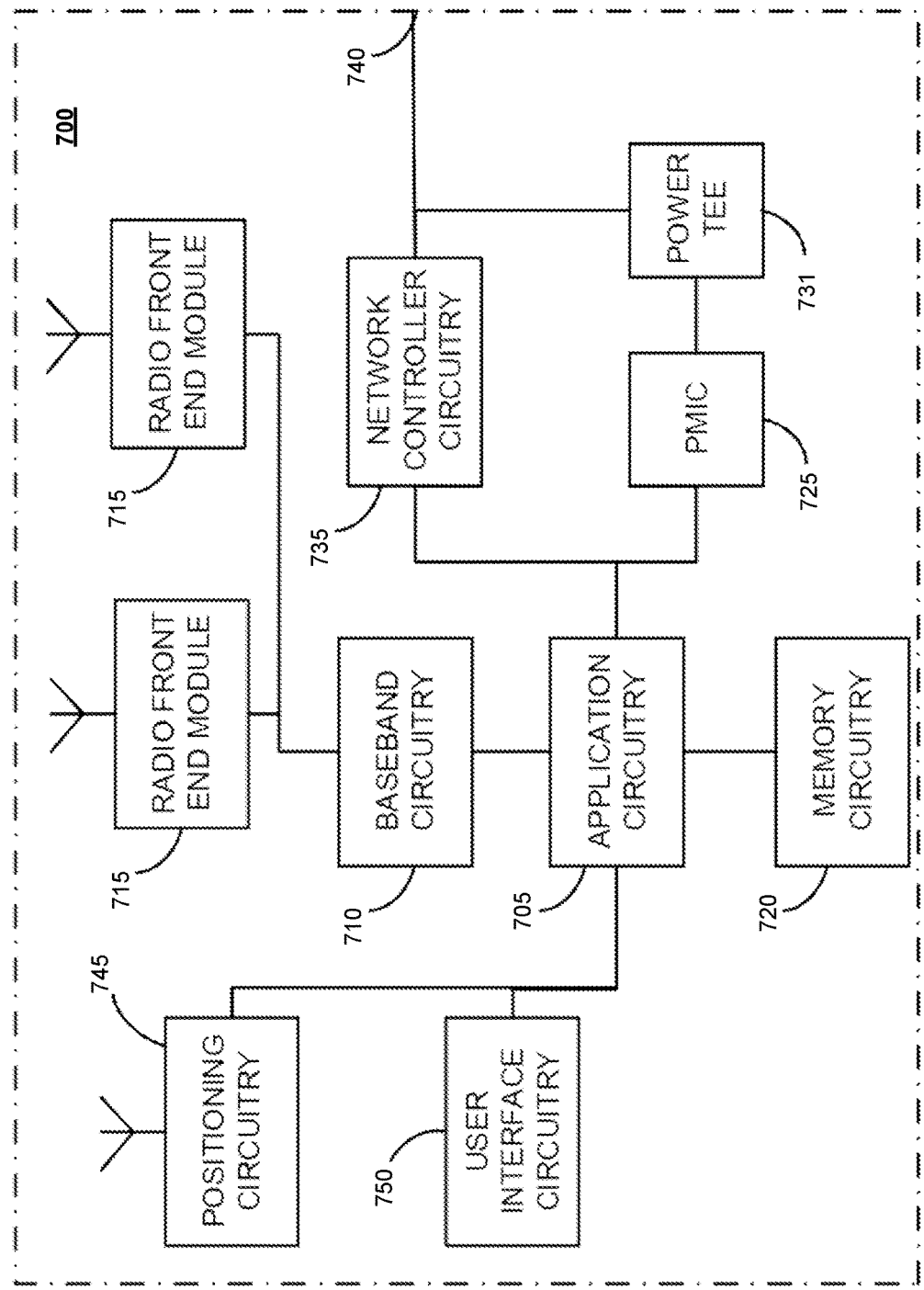
FIG. 7A depicts an example of infrastructure equipment in accordance with various embodiments.

FIG. 7A illustrates an example of infrastructure equipment 700 in accordance with various embodiments. The infrastructure equipment 700 (or "system 700") may be implemented as a base station, radio head, RAN node such as the RAN nodes 511 and/or AP 506 shown and described previously, application server(s) 530, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 731, network controller circuitry 735, network interface connector 740, satellite positioning circuitry 745, and user interface circuitry 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 8.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 731 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 511, etc.), or the like.

The components shown by FIG. 7A may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 7B:
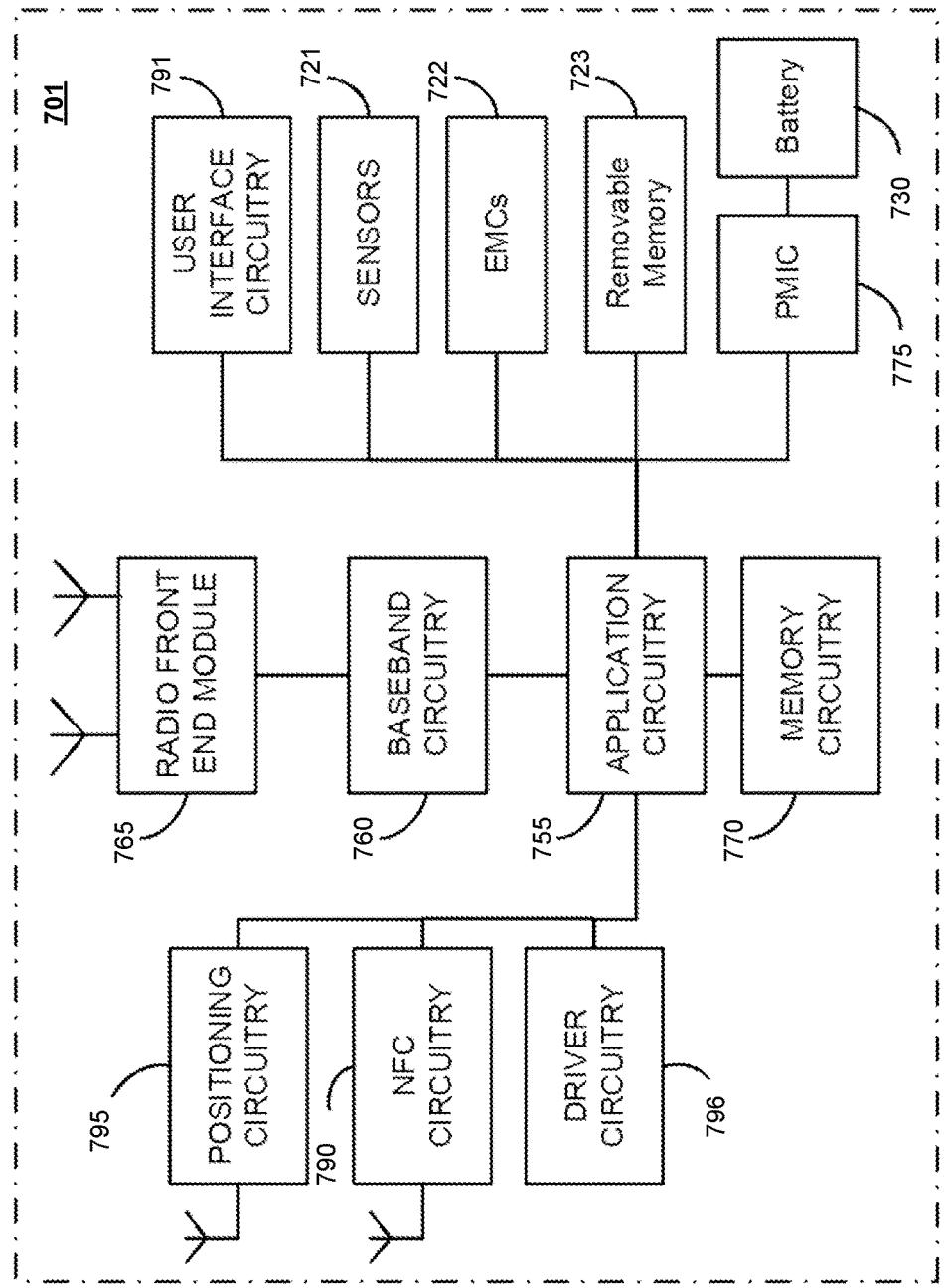
FIG. 7B depicts example components of a computer platform in accordance with various embodiments.

FIG. 7B illustrates an example of a platform 701 (or "device 701") in accordance with various embodiments. In embodiments, the computer platform 701 may be suitable for use as UEs 501a, 501b, 601, application servers 530, and/or any other element/device discussed herein. The platform 701 may include any combinations of the components shown in the example. The components of platform 701 may be implemented as integrated circuits (ICs), portions thereof, discrete electronic devices, or other modules, logic, hardware, software, firmware, or a combination thereof adapted in the computer platform 701, or as components otherwise incorporated within a chassis of a larger system. The block diagram of FIG. 7B is intended to show a high level view of components of the computer platform 701. However, some of the components shown may be omitted, additional components may be present, and different arrangement of the components shown may occur in other implementations.

Application circuitry 755 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 755 may be coupled with or may include memory/storage elements and may be configured to execute instructions stored in the memory/storage to enable various applications or operating systems to run on the system 701. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 705 may comprise, or may be, a special-purpose processor/controller to operate according to the various embodiments herein.

As examples, the processor(s) of application circuitry 755 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 755 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 755 may be a part of a system on a chip (SoC) in which the application circuitry 755 and other components are formed into a single integrated circuit, or a single package, such as the Edison™ or Galileo™ SoC boards from Intel® Corporation.

Additionally or alternatively, application circuitry 755 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 755 may comprise logic blocks or logic fabric, and other interconnected resources that may be programmed to perform various functions, such as the procedures, methods, functions, etc. of the various embodiments discussed herein. In such embodiments, the circuitry of application circuitry 755 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 760 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 760 are discussed infra with regard to FIG. 8.

The RFEMs 765 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 765, which incorporates both mmWave antennas and sub-mmWave.

The memory circuitry 770 may include any number and type of memory devices used to provide for a given amount of system memory. As examples, the memory circuitry 770 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 770 may be developed in accordance with a Joint Electron Devices Engineering Council (JEDEC) low power double data rate (LPDDR)-based design, such as LPDDR2, LPDDR3, LPDDR4, or the like. Memory circuitry 770 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 770 may be on-die memory or registers associated with the application circuitry 755. To provide for persistent storage of information such as data, applications, operating systems and so forth, memory circuitry 770 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 701 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 701. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 701 may also include interface circuitry (not shown) that is used to connect external devices with the platform 701. The external devices connected to the platform 701 via the interface circuitry include sensor circuitry 721 and electro-mechanical components (EMCs) 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 722 include devices, modules, or subsystems whose purpose is to enable platform 701 to change its state, position, and/or orientation, or move or control a mechanism or (sub)system. Additionally, EMCs 722 may be configured to generate and send messages/signalling to other components of the platform 701 to indicate a current state of the EMCs 722. Examples of the EMCs 722 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 701 is configured to operate one or more EMCs 722 based on one or more captured events and/or instructions or control signals received from a service provider and/or various clients.

In some implementations, the interface circuitry may connect the platform 701 with positioning circuitry 795. The positioning circuitry 795 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 795 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 795 may include a Micro-PNT IC that uses a master timing clock to perform position tracking/estimation without GNSS assistance. The positioning circuitry 795 may also be part of, or interact with, the baseband circuitry 710 and/or RFEMs 765 to communicate with the nodes and components of the positioning network. The positioning circuitry 795 may also provide position data and/or time data to the application circuitry 755, which may use the data to synchronize operations with various infrastructure (e.g., radio base stations), for turn-by-turn navigation applications, or the like In some implementations, the interface circuitry may connect the platform 701 with Near-Field Communication (NFC) circuitry 790. NFC circuitry 790 is configured to provide contactless, short-range communications based on radio frequency identification (RFID) standards, wherein magnetic field induction is used to enable communication between NFC circuitry 790 and NFC-enabled devices external to the platform 701 (e.g., an "NFC touchpoint"). NFC circuitry 790 comprises an NFC controller coupled with an antenna element and a processor coupled with the NFC controller. The NFC controller may be a chip/IC providing NFC functionalities to the NFC circuitry 790 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 790, or initiate data transfer between the NFC circuitry 790 and another active NFC device (e.g., a smartphone or an NFC-enabled POS terminal) that is proximate to the platform 701.

The driver circuitry 796 may include software and hardware elements that operate to control particular devices that are embedded in the platform 701, attached to the platform 701, or otherwise communicatively coupled with the platform 701. The driver circuitry 796 may include individual drivers allowing other components of the platform 701 to interact with or control various input/output (I/O) devices that may be present within, or connected to, the platform 701. For example, driver circuitry 796 may include a display driver to control and allow access to a display device, a touchscreen driver to control and allow access to a touchscreen interface of the platform 701, sensor drivers to obtain sensor readings of sensor circuitry 721 and control and allow access to sensor circuitry 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 775 (also referred to as "power management circuitry 775") may manage power provided to various components of the platform 701. In particular, with respect to the baseband circuitry 760, the PMIC 775 may control power-source selection, voltage scaling, battery charging, or DC-to-DC conversion. The PMIC 775 may often be included when the platform 701 is capable of being powered by a battery 730, for example, when the device is included in a UE 501a, 501b, 601.

In some embodiments, the PMIC 775 may control, or otherwise be part of, various power saving mechanisms of the platform 701. For example, if the platform 701 is in an RRC_Connected state, where it is still connected to the RAN node as it expects to receive traffic shortly, then it may enter a state known as Discontinuous Reception Mode (DRX) after a period of inactivity. During this state, the platform 701 may power down for brief intervals of time and thus save power. If there is no data traffic activity for an extended period of time, then the platform 701 may transition off to an RRC_Idle state, where it disconnects from the network and does not perform operations such as channel quality feedback, handover, etc. The platform 701 goes into a very low power state and it performs paging where again it periodically wakes up to listen to the network and then powers down again. The platform 701 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 701, although in some examples the platform 701 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 701 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 755 or other components of the platform 701. The BMS may also include an analog-to-digital (ADC) convertor that allows the application circuitry 755 to directly monitor the voltage of the battery 730 or the current flow from the battery 730. The battery parameters may be used to determine actions that the platform 701 may perform, such as transmission frequency, network operation, sensing frequency, and the like.

A power block, or other power supply coupled to an electrical grid may be coupled with the BMS to charge the battery 730. In some examples, the power block 730 may be replaced with a wireless power receiver to obtain the power wirelessly, for example, through a loop antenna in the computer platform 701. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 791 includes various input/output (I/O) devices present within, or connected to, the platform 701, and includes one or more user interfaces designed to enable user interaction with the platform 701 and/or peripheral component interfaces designed to enable peripheral component interaction with the platform 701. The user interface circuitry 791 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 701. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 701 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 8:
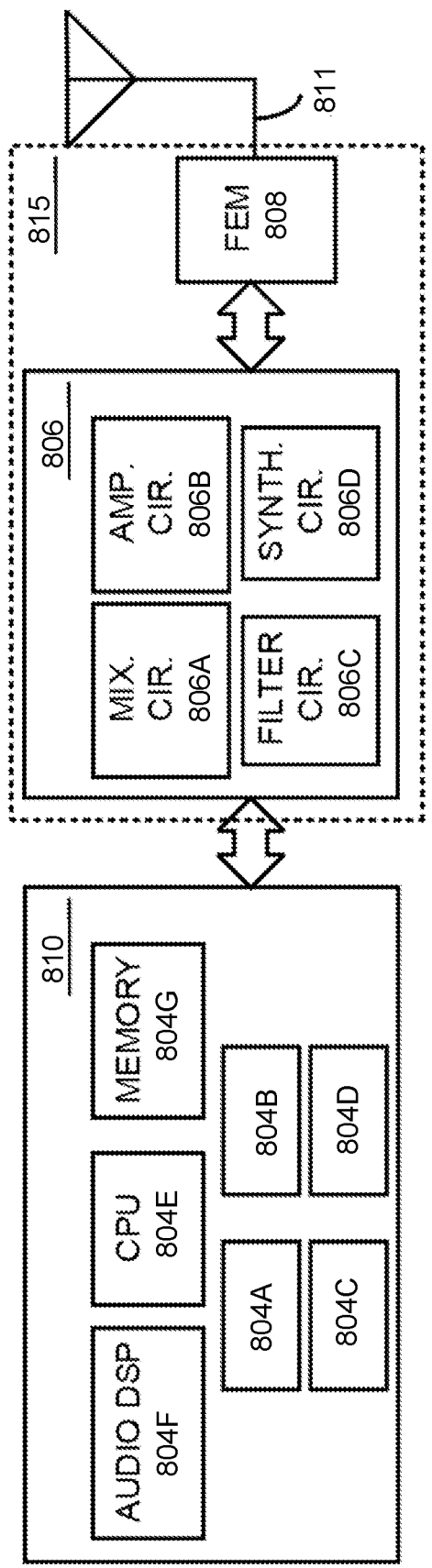
FIG. 8 depicts example components of baseband circuitry and radio frequency circuitry in accordance with various embodiments.

FIG. 8 illustrates example components of baseband circuitry 810 and radio front end modules (RFEM) 815 in accordance with various embodiments. The baseband circuitry 810 corresponds to the baseband circuitry 710 and 760 of FIGS. 7A and 7B, respectively. The RFEM 815 corresponds to the RFEM 715 and 765 of FIGS. 7A and 7B, respectively. As shown, the RFEMs 815 may include Radio Frequency (RF) circuitry 806, front-end module (FEM) circuitry 808, antenna array 811 coupled together at least as shown.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 705/755 (see FIGS. 7A and 7B) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804D for other existing generations, generations in development or to be developed in the future (e.g., sixth generation (6G), etc.). In other embodiments, some or all of the functionality of baseband processors 804A-D may be included in modules stored in the memory 804G and executed via a Central Processing Unit (CPU) 804E. In other embodiments, some or all of the functionality of baseband processors 804A-D may be provided as hardware accelerators (e.g., FPGAs, ASICs, etc.) loaded with the appropriate bit streams or logic blocks stored in respective memory cells. In various embodiments, the memory 804G may store program code of a real-time OS (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio digital signal processor(s) (DSP) 804F. The audio DSP(s) 804F include elements for compression/decompression and echo cancellation and may include other suitable processing elements in other embodiments.

In some embodiments, each of the processors 804A-804E include respective memory interfaces to send/receive data to/from the memory 804G. The baseband circuitry 810 may further include one or more interfaces to communicatively couple to other circuitries/devices, such as an interface to send/receive data to/from memory external to the baseband circuitry 810; an application circuitry interface to send/receive data to/from the application circuitry 705/755 of FIGS. 7-XT); an RF circuitry interface to send/receive data to/from RF circuitry 806 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 775.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 810 and/or RF circuitry 806 are part of a Wi-Fi communication system. In the second example, the protocol processing circuitry would operate Wi-Fi MAC and logical link control (LLC) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 705/755 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 810 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 705/755 depending on the desired output frequency. In some embodiments, a divider control input (e.g., N) may be determined from a look-up table based on a channel indicated by the application circuitry 705/755.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from antenna array 811, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 811. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein. The antenna array 811 may comprise microstrip antennas or printed antennas that are fabricated on the surface of one or more printed circuit boards. The antenna array 811 may be formed in as a patch of metal foil (e.g., a patch antenna) in a variety of shapes, and may be coupled with the RF circuitry 806 and/or FEM circuitry 808 using metal transmission lines or the like.

Processors of the application circuitry 705/755 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 705/755 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 9:
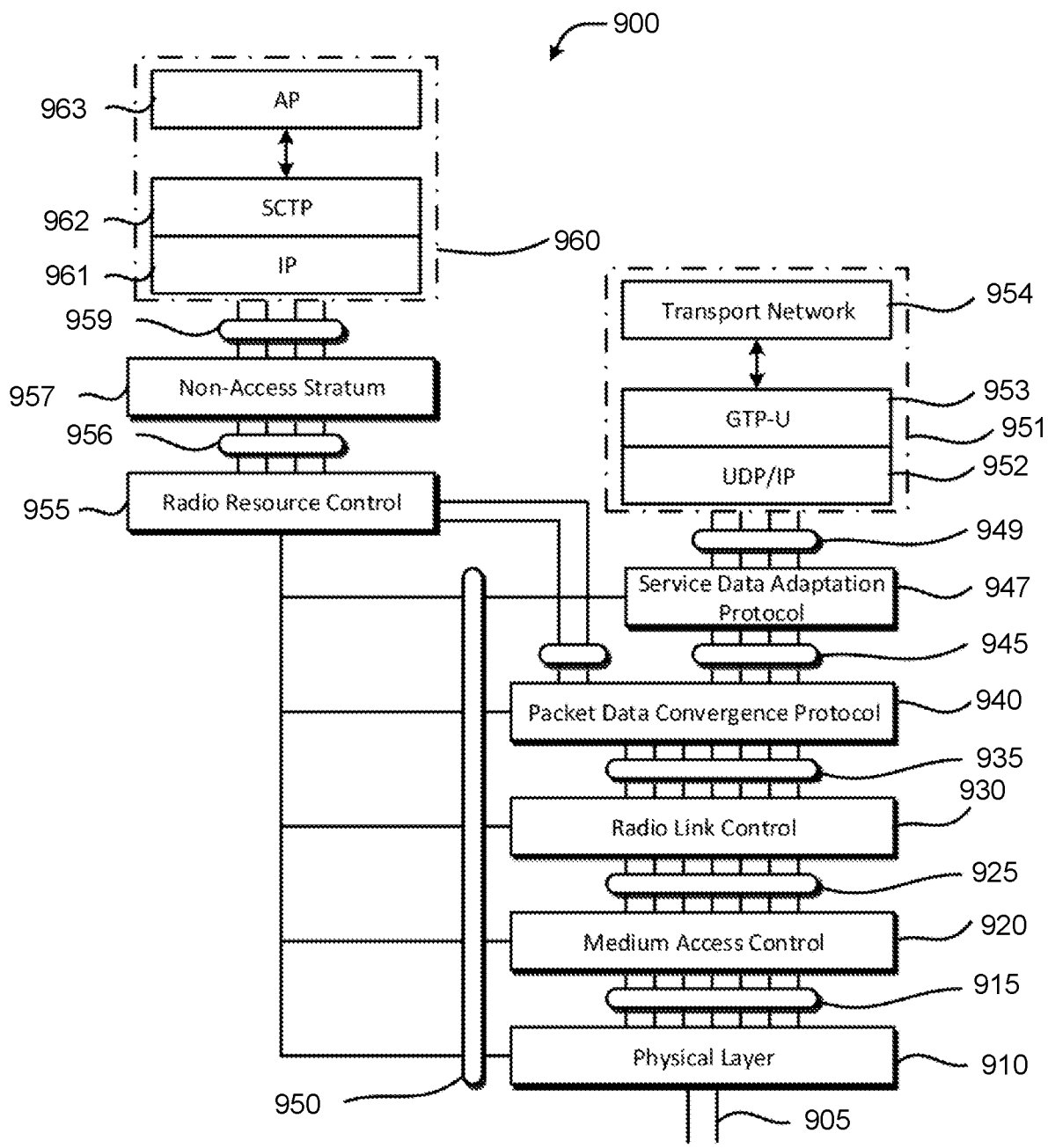
FIG. 9 is an illustration of various protocol functions that may be used for various protocol stacks in accordance with various embodiments.

FIG. 9 illustrates various protocol functions that may be implemented in a wireless communication device according to various embodiments. In particular, FIG. 9 includes an arrangement 900 showing interconnections between various protocol layers/entities. The following description of FIG. 9 is provided for various protocol layers/entities that operate in conjunction with the 5G/NR system standards and LTE system standards, but some or all of the aspects of FIG. 9 may be applicable to other wireless communication network systems as well.

The protocol layers of arrangement 900 may include one or more of PHY 910, MAC 920, RLC 930, PDCP 940, SDAP 947, RRC 955, and NAS layer 957, in addition to other higher layer functions not illustrated. The protocol layers may include one or more service access points (e.g., items 959, 956, 950, 949, 945, 935, 925, and 915 in FIG. 9) that may provide communication between two or more protocol layers.

The PHY 910 may transmit and receive physical layer signals 905 that may be received from or transmitted to one or more other communication devices. The physical layer signals 905 may comprise one or more physical channels, such as those discussed herein. The PHY 910 may further perform link adaptation or adaptive modulation and coding (AMC), power control, cell search (e.g., for initial synchronization and handover purposes), and other measurements used by higher layers, such as the RRC 955. The PHY 910 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 910 may process requests from and provide indications to an instance of MAC 920 via one or more PHY-SAP 915. According to some embodiments, requests and indications communicated via PHY-SAP 915 may comprise one or more transport channels.

Instance(s) of MAC 920 may process requests from, and provide indications to, an instance of RLC 930 via one or more MAC-SAPs 925. These requests and indications communicated via the MAC-SAP 925 may comprise one or more logical channels. The MAC 920 may perform mapping between the logical channels and transport channels, multiplexing of MAC SDUs from one or more logical channels onto TBs to be delivered to PHY 910 via the transport channels, de-multiplexing MAC SDUs to one or more logical channels from TBs delivered from the PHY 910 via transport channels, multiplexing MAC SDUs onto TBs, scheduling information reporting, error correction through HARQ, and logical channel prioritization.

Instance(s) of RLC 930 may process requests from and provide indications to an instance of PDCP 940 via one or more radio link control service access points (RLC-SAP) 935. These requests and indications communicated via RLC-SAP 935 may comprise one or more RLC channels. The RLC 930 may operate in a plurality of modes of operation, including: Transparent Mode™, Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 940 may process requests from and provide indications to instance(s) of RRC 955 and/or instance(s) of SDAP 947 via one or more packet data convergence protocol service access points (PDCP-SAP) 945. These requests and indications communicated via PDCP-SAP 945 may comprise one or more radio bearers. The PDCP 940 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 947 may process requests from and provide indications to one or more higher layer protocol entities via one or more SDAP-SAP 949. These requests and indications communicated via SDAP-SAP 949 may comprise one or more QoS flows. The SDAP 947 may map QoS flows to DRBs, and vice versa, and may also mark QFIs in DL and UL packets. A single SDAP entity 947 may be configured for an individual PDU session. In the UL direction, the NG-RAN 510 may control the mapping of QoS Flows to DRB(s) in two different ways, reflective mapping or explicit mapping. For reflective mapping, the SDAP 947 of a UE 501 may monitor the QFIs of the DL packets for each DRB, and may apply the same mapping for packets flowing in the UL direction. For a DRB, the SDAP 947 of the UE 501 may map the UL packets belonging to the QoS flows(s) corresponding to the QoS flow ID(s) and PDU session observed in the DL packets for that DRB. To enable reflective mapping, the NG-RAN 610 may mark DL packets over the Uu interface with a QoS flow ID. The explicit mapping may involve the RRC 955 configuring the SDAP 947 with an explicit QoS flow to DRB mapping rule, which may be stored and followed by the SDAP 947. In embodiments, the SDAP 947 may only be used in NR implementations and may not be used in LTE implementations.

The RRC 955 may configure, via one or more management service access points (M-SAP), aspects of one or more protocol layers, which may include one or more instances of PHY 910, MAC 920, RLC 930, PDCP 940 and SDAP 947. In embodiments, an instance of RRC 955 may process requests from and provide indications to one or more NAS entities 957 via one or more RRC-SAPs 956. The main services and functions of the RRC 955 may include broadcast of system information (e.g., included in MIBs or SIBs related to the NAS), broadcast of system information related to the access stratum (AS), paging, establishment, maintenance and release of an RRC connection between the UE 501 and RAN 510 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 957 may form the highest stratum of the control plane between the UE 501 and the AMF 621. The NAS 957 may support the mobility of the UEs 501 and the session management procedures to establish and maintain IP connectivity between the UE 501 and a P-GW in LTE systems.

According to various embodiments, one or more protocol entities of arrangement 900 may be implemented in UEs 501, RAN nodes 511, AMF 621 in NR implementations or MME 611 in LTE implementations, UPF 602 in NR implementations or S-GW 617 and P-GW 618 in LTE implementations, or the like to be used for control plane or user plane communications protocol stack between the aforementioned devices. In such embodiments, one or more protocol entities that may be implemented in one or more of UE 501, gNB 511, AMF 621, etc. may communicate with a respective peer protocol entity that may be implemented in or on another device using the services of respective lower layer protocol entities to perform such communication. In some embodiments, a gNB-CU of the gNB 511 may host the RRC 955, SDAP 947, and PDCP 940 of the gNB that controls the operation of one or more gNB-DUs, and the gNB-DUs of the gNB 511 may each host the RLC 930, MAC 920, and PHY 910 of the gNB 511.

In a first example, a control plane protocol stack may comprise, in order from highest layer to lowest layer, NAS 957, RRC 955, PDCP 940, RLC 930, MAC 920, and PHY 910. In this example, upper layers 960 may be built on top of the NAS 957, which includes an IP layer 961, an SCTP 962, and an application layer signaling protocol (AP) 963.

In NR implementations, the AP 963 may be an NG application protocol layer (NGAP or NG-AP) 963 for the NG interface 513 defined between the NG-RAN node 511 and the AMF 621, or the AP 963 may be an Xn application protocol layer (XnAP or Xn-AP) 963 for the Xn interface 512 that is defined between two or more RAN nodes 511.

The NG-AP 963 may support the functions of the NG interface 513 and may comprise Elementary Procedures (EPs). An NG-AP EP may be a unit of interaction between the NG-RAN node 511 and the AMF 621. The NG-AP 963 services may comprise two groups: UE-associated services (e.g., services related to a UE 501a, 501b) and non-UE-associated services (e.g., services related to the whole NG interface instance between the NG-RAN node 511 and AMF 621). These services may include functions including, but not limited to: a paging function for the sending of paging requests to NG-RAN nodes 511 involved in a particular paging area; a UE context management function for allowing the AMF 621 to establish, modify, and/or release a UE context in the AMF 621 and the NG-RAN node 511; a mobility function for UEs 501 in ECM-CONNECTED mode for intra-system HOs to support mobility within NG-RAN and inter-system HOs to support mobility from/to EPS systems; a NAS Signaling Transport function for transporting or rerouting NAS messages between UE 501 and AMF 621; a NAS node selection function for determining an association between the AMF 621 and the UE 501; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 511 via CN 520; and/or other like functions.

The XnAP 963 may support the functions of the Xn interface 512 and may comprise XnAP basic mobility procedures and XnAP global procedures. The XnAP basic mobility procedures may comprise procedures used to handle UE mobility within the NG RAN 511 (or E-UTRAN 610), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 963 may be an S1 Application Protocol layer (S1-AP) 963 for the S1 interface 513 defined between an E-UTRAN node 511 and an MME, or the AP 963 may be an X2 application protocol layer (X2AP or X2-AP) 963 for the X2 interface 512 that is defined between two or more E-UTRAN nodes 511.

The S1 Application Protocol layer (S1-AP) 963 may support the functions of the S1 interface, and similar to the NG-AP discussed previously, the S1-AP may comprise S1-AP EPs. An S1-AP EP may be a unit of interaction between the E-UTRAN node 511 and an MME 611 within an LTE CN 520. The S1-AP 963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 963 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) 962 may provide guaranteed delivery of application layer messages (e.g., NGAP or XnAP messages in NR implementations, or SI-AP or X2AP messages in LTE implementations). The SCTP 962 may ensure reliable delivery of signaling messages between the RAN node 511 and the AMF 621/MME 611 based, in part, on the IP protocol, supported by the IP 961. The Internet Protocol layer (IP) 961 may be used to perform packet addressing and routing functionality. In some implementations the IP layer 961 may use point-to-point transmission to deliver and convey PDUs. In this regard, the RAN node 511 may comprise L2 and L1 layer communication links (e.g., wired or wireless) with the MME/AMF to exchange information.

In a second example, a user plane protocol stack may comprise, in order from highest layer to lowest layer, SDAP 947, PDCP 940, RLC 930, MAC 920, and PHY 910. The user plane protocol stack may be used for communication between the UE 501, the RAN node 511, and UPF 602 in NR implementations or an S-GW 617 and P-GW 618 in LTE implementations. In this example, upper layers 951 may be built on top of the SDAP 947, and may include a user datagram protocol (UDP) and IP security layer (UDP/IP) 952, a General Packet Radio Service (GPRS) Tunneling Protocol for the user plane layer (GTP-U) 953, and a User Plane PDU layer (UP PDU) 963.

The transport network layer 954 (also referred to as a "transport layer") may be built on IP transport, and the GTP-U 953 may be used on top of the UDP/IP layer 952 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 953 may be used for carrying user data within the GPRS core network and between the radio access network and the core network. The user data transported can be packets in any of IPv4, IPv6, or PPP formats, for example. The UDP/IP 952 may provide checksums for data integrity, port numbers for addressing different functions at the source and destination, and encryption and authentication on the selected data flows. The RAN node 511 and the S-GW 617 may utilize an S1-U interface to exchange user plane data via a protocol stack comprising an L1 layer (e.g., PHY 910), an L2 layer (e.g., MAC 920, RLC 930, PDCP 940, and/or SDAP 947), the UDP/IP layer 952, and the GTP-U 953. The S-GW 617 and the P-GW 618 may utilize an S5/S8a interface to exchange user plane data via a protocol stack comprising an L1 layer, an L2 layer, the UDP/IP layer 952, and the GTP-U 953. As discussed previously, NAS protocols may support the mobility of the UE 501 and the session management procedures to establish and maintain IP connectivity between the UE 501 and the P-GW 618.

Moreover, although not shown by FIG. 9, an application layer may be present above the AP 963 and/or the transport network layer 954. The application layer may be a layer in which a user of the UE 501, RAN node 511, or other network element interacts with software applications being executed, for example, by application circuitry 705 or application circuitry 755, respectively. The application layer may also provide one or more interfaces for software applications to interact with communications systems of the UE 501 or RAN node 511, such as the baseband circuitry 810. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 10:
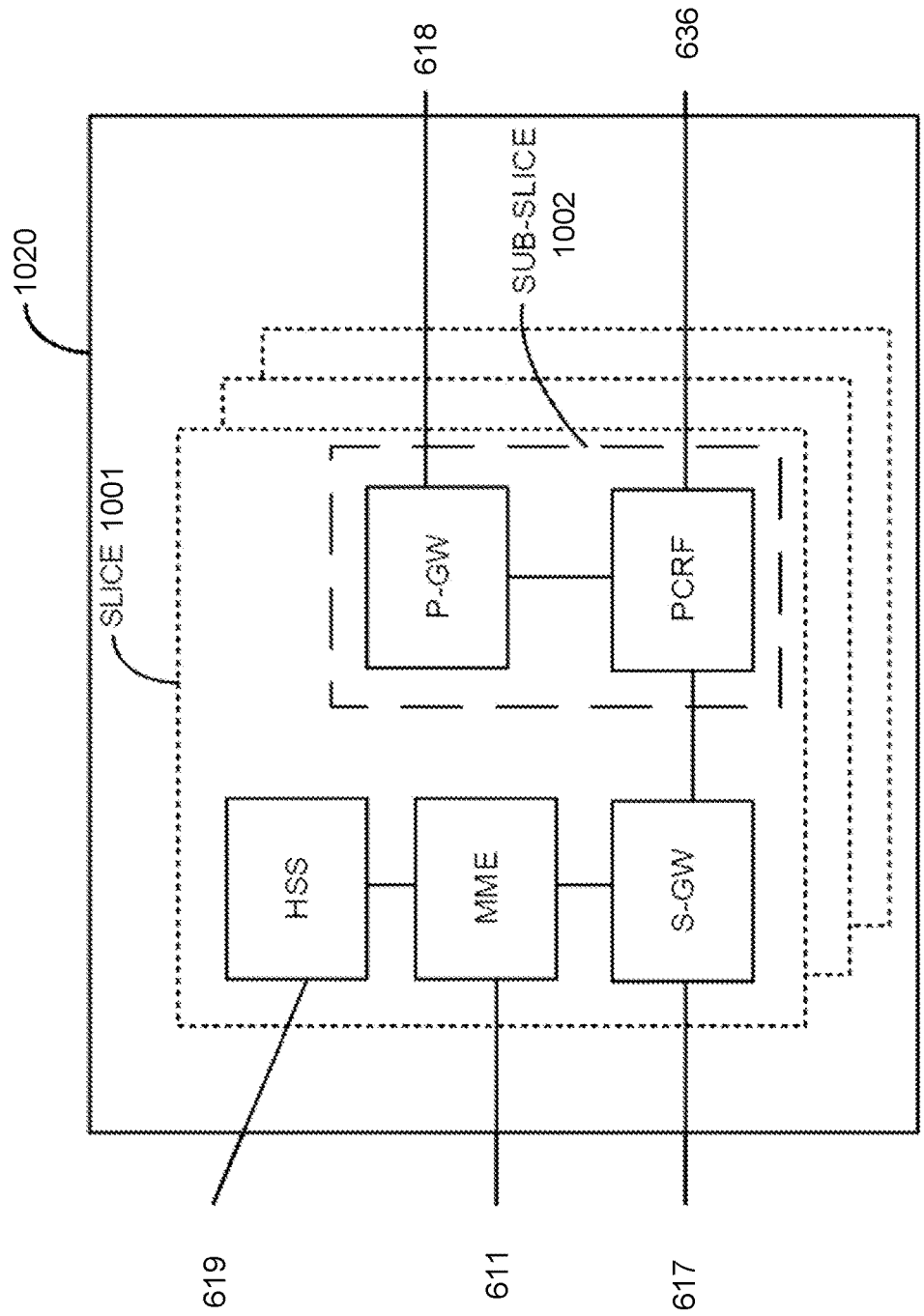
FIG. 10 illustrates components of a core network in accordance with various embodiments.

FIG. 10 illustrates components of a core network in accordance with various embodiments. The components of the CN 620 may be implemented in one physical node or separate physical nodes including components to read and execute instructions from a machine-readable or computer-readable medium (e.g., a non-transitory machine-readable storage medium). In embodiments, the components of CN 640 may be implemented in a same or similar manner as discussed herein with regard to the components of CN 620. In some embodiments, NFV is utilized to virtualize any or all of the above-described network node functions via executable instructions stored in one or more computer-readable storage mediums (described in further detail below). A logical instantiation of the CN 620 may be referred to as a network slice 1001, and individual logical instantiations of the CN 620 may provide specific network capabilities and network characteristics. A logical instantiation of a portion of the CN 620 may be referred to as a network sub-slice 1002 (e.g., the network sub-slice 1002 is shown to include the P-GW 618 and the PCRF 636).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 6B), a network slice always comprises a RAN part and a CN part. The support of network slicing relies on the principle that traffic for different slices is handled by different PDU sessions. The network can realize the different network slices by scheduling and also by providing different L1/L2 configurations. The UE 601 provides assistance information for network slice selection in an appropriate RRC message, if it has been provided by NAS. While the network can support large number of slices, the UE need not support more than 8 slices simultaneously.

A network slice may include the CN 640 control plane and user plane NFs, NG-RANs 610 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 601 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 621 instance serving an individual UE 601 may belong to each of the network slice instances serving that UE.

Network Slicing in the NG-RAN 610 involves RAN slice awareness. RAN slice awareness includes differentiated handling of traffic for different network slices, which have been pre-configured. Slice awareness in the NG-RAN 610 is introduced at the PDU session level by indicating the S-NSSAI corresponding to a PDU session in all signaling that includes PDU session resource information. How the NG-RAN 610 supports the slice enabling in terms of NG-RAN functions (e.g., the set of network functions that comprise each slice) is implementation dependent. The NG-RAN 610 selects the RAN part of the network slice using assistance information provided by the UE 601 or the 5GC 640, which unambiguously identifies one or more of the pre-configured network slices in the PLMN. The NG-RAN 610 also supports resource management and policy enforcement between slices as per SLAs. A single NG-RAN node may support multiple slices, and the NG-RAN 610 may also apply an appropriate RRM policy for the SLA in place to each supported slice. The NG-RAN 610 may also support QoS differentiation within a slice.

The NG-RAN 610 may also use the UE assistance information for the selection of an AMF 621 during an initial attach, if available. The NG-RAN 610 uses the assistance information for routing the initial NAS to an AMF 621. If the NG-RAN 610 is unable to select an AMF 621 using the assistance information, or the UE 601 does not provide any such information, the NG-RAN 610 sends the NAS signaling to a default AMF 621, which may be among a pool of AMFs 621. For subsequent accesses, the UE 601 provides a temp ID, which is assigned to the UE 601 by the 5GC 640, to enable the NG-RAN 610 to route the NAS message to the appropriate AMF 621 as long as the temp ID is valid. The NG-RAN 610 is aware of, and can reach, the AMF 621 that is associated with the temp ID. Otherwise, the method for initial attach applies.

The NG-RAN 610 supports resource isolation between slices. NG-RAN 610 resource isolation may be achieved by means of RRM policies and protection mechanisms that should avoid that shortage of shared resources if one slice breaks the service level agreement for another slice. In some implementations, it is possible to fully dedicate NG-RAN 610 resources to a certain slice. How NG-RAN 610 supports resource isolation is implementation dependent.

Some slices may be available only in part of the network. Awareness in the NG-RAN 610 of the slices supported in the cells of its neighbors may be beneficial for inter-frequency mobility in connected mode. The slice availability may not change within the UE's registration area. The NG-RAN 610 and the 5GC 640 are responsible to handle a service request for a slice that may or may not be available in a given area. Admission or rejection of access to a slice may depend on factors such as support for the slice, availability of resources, support of the requested service by NG-RAN 610.

The UE 601 may be associated with multiple network slices simultaneously. In case the UE 601 is associated with multiple slices simultaneously, only one signaling connection is maintained, and for intra-frequency cell reselection, the UE 601 tries to camp on the best cell. For inter-frequency cell reselection, dedicated priorities can be used to control the frequency on which the UE 601 camps. The 5GC 640 is to validate that the UE 601 has the rights to access a network slice. Prior to receiving an Initial Context Setup Request message, the NG-RAN 610 may be allowed to apply some provisional/local policies, based on awareness of a particular slice that the UE 601 is requesting to access. During the initial context setup, the NG-RAN 610 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
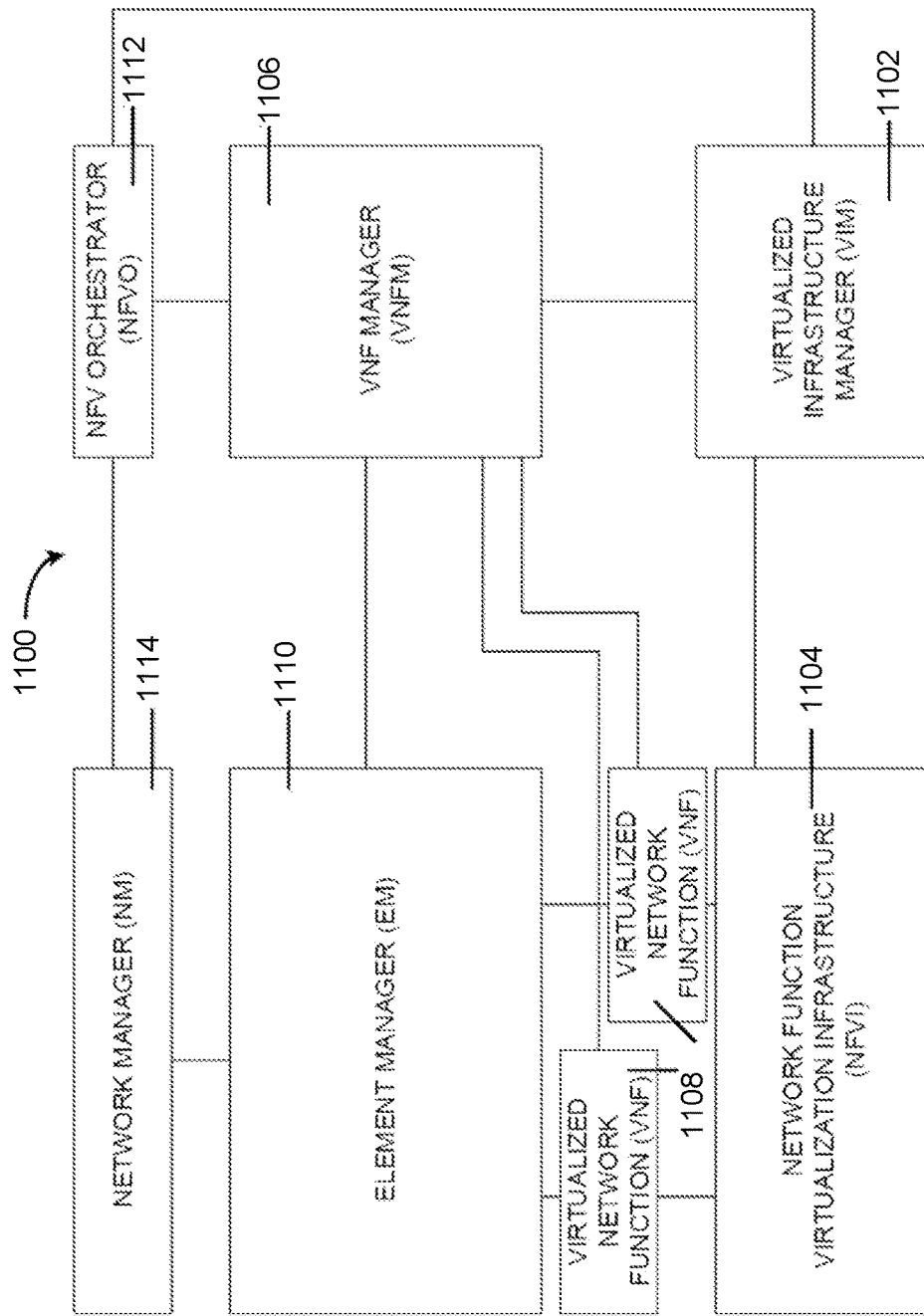
FIG. 11 is a block diagram illustrating components, according to some example embodiments, of a system to support NFV.

FIG. 11 is a block diagram illustrating components, according to some example embodiments, of a system 1100 to support NFV. The system 1100 is illustrated as including a VIM 1102, an NFVI 1104, an VNFM 1106, VNFs 1108, an EM 1110, an NFVO 1112, and a NM 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of VMs associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, PM data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
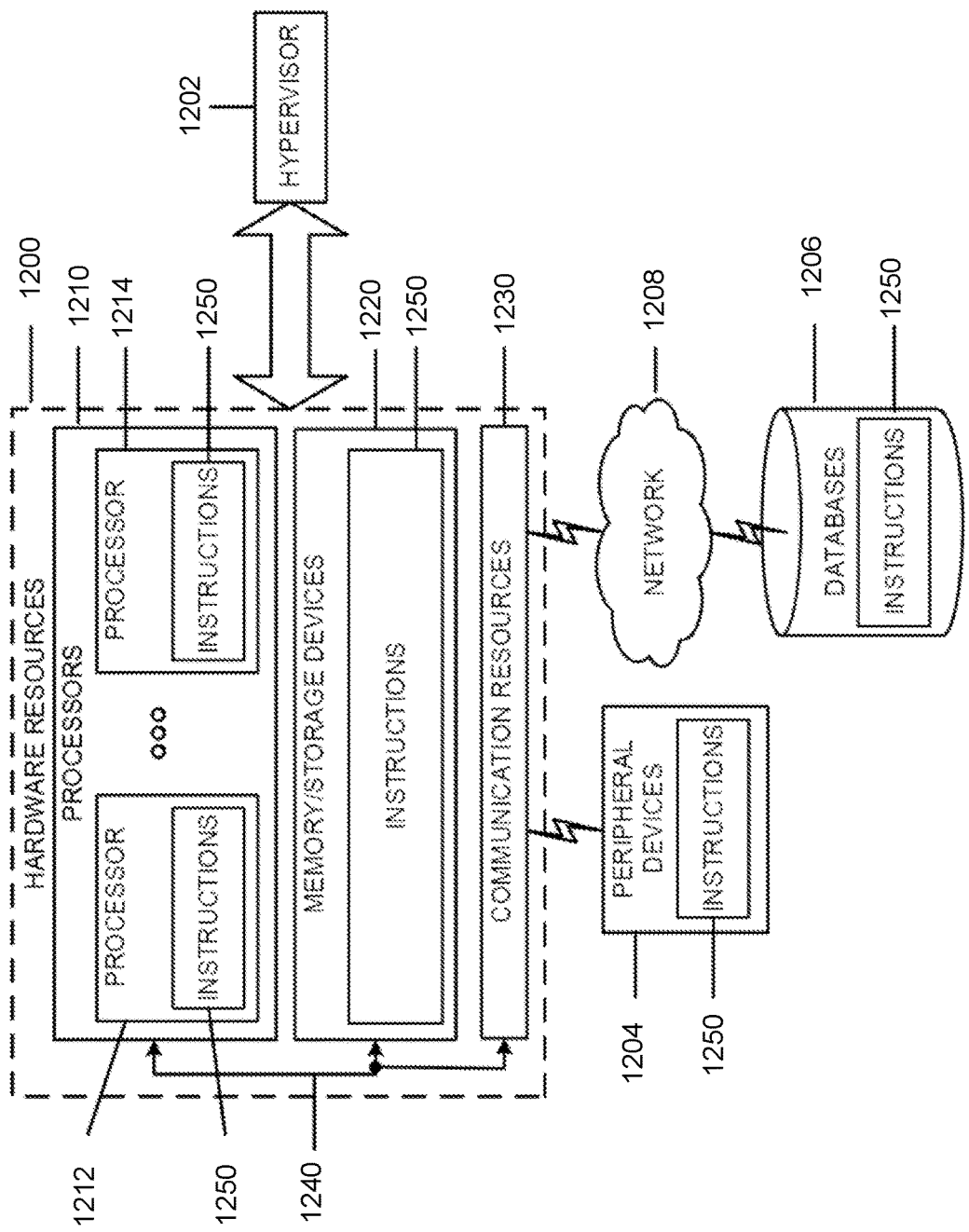
FIG. 12 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 may include, for example, a processor 1212 and a processor 1214. The processor(s) 1210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 may include main memory, disk storage, or any suitable combination thereof. The memory/storage devices 1220 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via USB), cellular communication components, NFC components, Bluetooth® (or Bluetooth® Low Energy) components, Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 13:
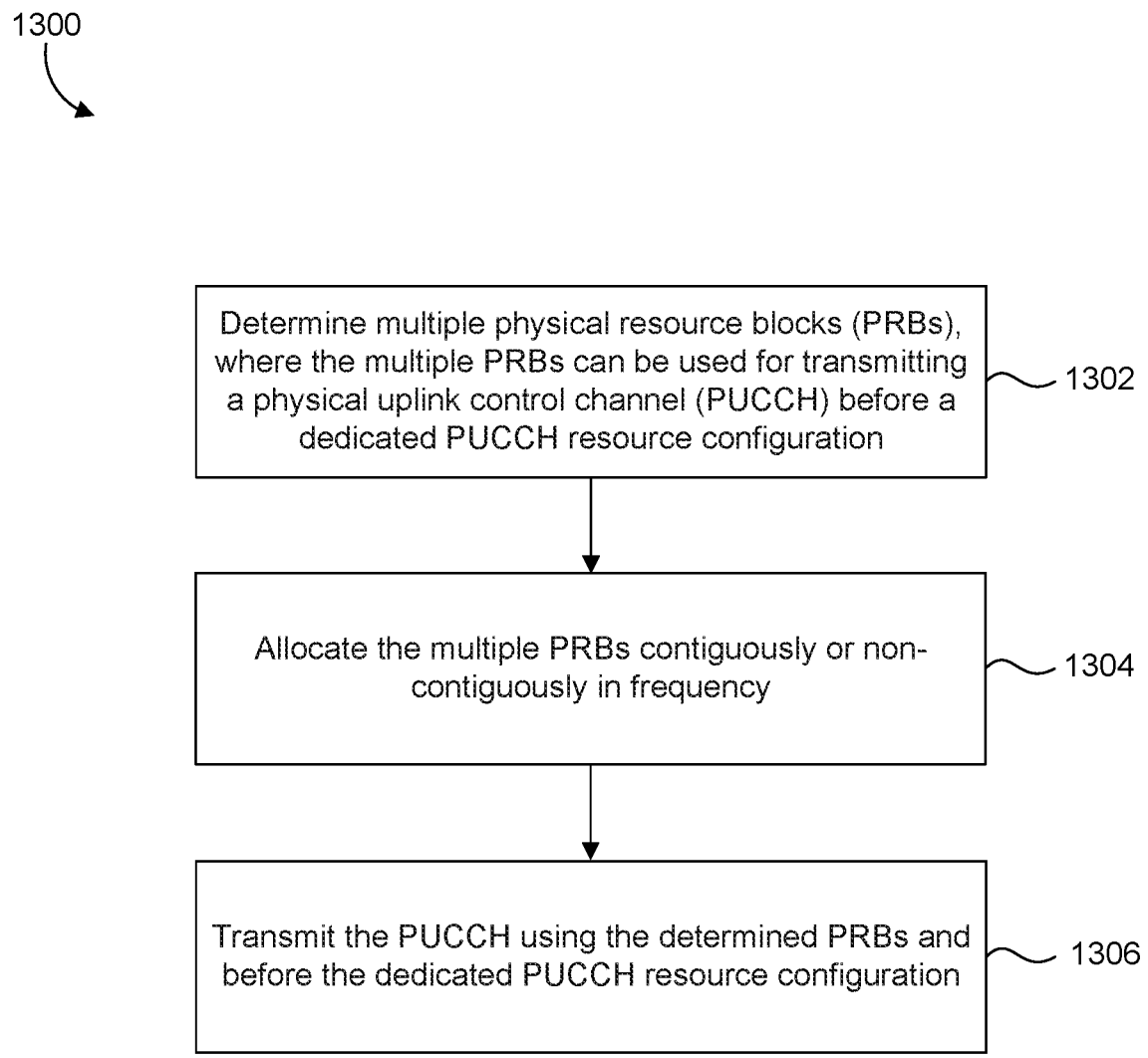
FIG. 13 depicts an example flowchart for practicing the various embodiments discussed herein, for example, for resource allocation during initial access.

FIG. 13 illustrates a flowchart 1300 that describes a UE, such as UE 501*a*, 501*b*, 601, 700 or 800, for resource allocation during initial access, according to embodiments of the disclosure. In embodiments, the flowchart 1300 can be performed or controlled by a processor or processor circuitry in the UE described in the various embodiments herein, including the processor shown in FIG. 12, and/or the application circuitry 755, and/or the baseband circuitry 760 shown FIG. 7B.

At 1302, multiple physical resource blocks (PRBs) are determined. For example, the UE can determined the multiple PRBs. The multiple PRBs can be used for transmitting a physical uplink control channel (PUCCH) before a dedicated PUCCH resource configuration. In some embodiments, the multiple PRBs can be determined in accordance with a predetermined requirement.

At 1304, the multiple PRBs can be allocated contiguously or non-contiguously in frequency. For example, the PUCCH can include a PUCCH format 0, a PUCCH format 1, a PUCCH format 2, or a PUCCH format 3 and the multiple PRBs can be allocated contiguously in frequency. Additionally, or alternatively, the PUCCH can include a PUCCH format 0, a PUCCH format 1, a PUCCH format 2, or a PUCCH format 3 and the multiple PRBs can be allocated non-contiguously in frequency. In some embodiments, allocating the multiple PRBs can also include allocating the multiple PRBs such that a frequency spacing between two consecutive PRBs is in accordance with the predetermined requirement.

At 1306, the PUCCH can be transmitted using the determined PRBs and before the dedicated PUCCH resource configuration. The dedicated PUCCH resource configuration can include initial access before Radio Resource Control (RRC) connection setup. According to some embodiments, method 13 can also include determining additional parameters associated with the PUCCH. The additional parameters can include at least one of a distance between two consecutive PRBs, a cyclic shift offset, or an intra-slot frequency hopping parameter.

EXAMPLES

Example 1 includes a method of wireless communication for a 5G NR system operating in unlicensed spectrum (NR-unlicensed), the method comprising:

determining or causing to determine time and frequency resources to be used for transmission of a physical uplink control channel (PUCCH) before dedicated PUCCH resource configuration, based on different PUCCH formats, in accordance with the regulatory requirements associated with the usage of unlicensed spectrum, wherein before dedicated PUCCH resource configuration includes during initial access, before RRC connection setup).

Example 2 includes the method of example 1 and/or some other examples herein, wherein PUCCH resource set before RRC connection set up is configured using existing PUCCH formats used in NR-licensed operation including PUCCH formats 0 and 1 which are inherently single-PRB PUCCH formats, each PRB comprising 12 sub-carriers, wherein both the single-PRB PUCCH formats are enhanced to multiple PRBs (e.g., n PRBs) so that OCB requirement is met, wherein the n PRBs are allocated contiguously in frequency, where $n \geq \lceil \{OCB/(12*SCS)\} \rceil$, OCB is the occupied channel bandwidth criteria mandated by regulation (for example 80/6-100% of nominal channel bandwidth or temporally, 2 MHz bandwidth) and SCS is sub-carrier spacing (e.g., in FR1, SCS for PUCCH is 15/30/60 KHz), and the method comprises:

applying or causing to apply an appropriate scaling in the above expression of n if OCB and SCS are expressed in different units;

transmitting or causing to transmit 1-bit HARQ-ACK in response to message 4 during initial access using one of the multi-PRB PUCCH resources indicated by PUCCH resource index, wherein if allowed by regulation, OCB can be met using frequency hopping, so that the combined bandwidth of PUCCH in two hops meets OCB requirement, while BW of each frequency hop can be less than OCB, wherein each hop can have single PRB or more than one PRBs; and transmitting or causing to transmit 1-bit HARQ-ACK in response to message 4 during initial access using NR PUCCH format 0/1 with frequency hopping or enhanced PUCCH formats 0/1 with >1 PRBs with enabled frequency hopping.

Example 3 includes the method of example 2 and/or some other examples herein, wherein NR PUCCH resource configuration table before RRC connection is enhanced by providing additional parameters, which are either be pre-configured, indicated by higher layer signaling (via MSI, RMSI or OSI), or implicitly derived in order to support contiguous allocation of n PRBs using PUCCH formats 0 and 1 for PUCCH resource set, wherein the parameters are listed in the following table

| Additional Parameters | Value |
|---|---|
| Number of PRBs (n) | n ≥ 12/6/3 for SCS = 15/30/60 KHz |
| Cyclic shift offset applied on n PRBs | $\Delta_{CS-offset}$ |
| Intra-slot frequency hopping | 0 (disabled) or 1 (enabled) | wherein $\Delta_{CS-offset}$ is either be a fixed offset, or a pattern of CS offsets which is predefined in 3GPP specification, or configured via higher layer signaling or derived implicitly as a function of other parameters (e.g., PUCCH resource index, symbol/slot index etc.), wherein n is either predefined, or can be configured by higher layer signaling, or a combination thereof (e.g., it can be predefined, but that value can be overwritten by higher layer signaling), and the method comprises:

transmitting or causing to transmit 1-bit HARQ-ACK in response to message 4 during initial access using a PUCCH resource configured by the additional parameters along with the enhanced PUCCH formats.

Example 4 includes the method of example 3 and/or some other examples herein, wherein the additional parameters are incorporated in defining parameters that are implicitly derived for PUCCH resource configuration during initial access, for example PRB index in the $1^{st}$ hop, PRB index in the $2^{nd}$ hop and initial CS index in the set of CS indexes, wherein single PRB PUCCH resource (as in NR-licensed) is enhanced to multi-PRB in NR-unlicensed, and PRB index of the $i^{th}$ PRB in the $1^{st}$ and $2^{nd}$ hops (when frequency hopping is enabled) is redefined as:

$$PRB \text{ index } (1^{st} \text{ hop}) = \begin{cases} RB_{BWP}^{offset} + \lfloor r_{PUCCH}/N_{CS} \rfloor + (i-1), \\ \quad \text{if } \lfloor r_{PUCCH}/8 \rfloor = 0 \\ N_{BWP}^{size} - 1 - RB_{BWP}^{offset} - \lfloor (r_{PUCCH}-8)/N_{CS} \rfloor - (i-1), \\ \quad \text{otherwise} \end{cases}$$

$$PRB \text{ index } (2^{nd} \text{ hop}) = \begin{cases} RB_{BWP}^{offset} + \lfloor (r_{PUCCH}-8)/N_{CS} \rfloor + (i-1), \\ \quad \text{if } \lfloor r_{PUCCH}/8 \rfloor = 1 \\ N_{BWP}^{size} - 1 - RB_{BWP}^{offset} - \lfloor r_{PUCCH}/N_{CS} \rfloor - (i-1), \\ \quad \text{otherwise} \end{cases}$$

where, i=1, 2, . . . , n. If frequency hopping is disabled, the PRB indexes are derived as:

$PRB \text{ index } (i^{th} PRB) = RB_{BWP}^{offset} + \lfloor r_{PUCCH}/N_{CS} \rfloor + (i-1), i=1,2, \ldots ,n$ wherein the CS index applied on the $i^{th}$ PRB is defined as (initial CS index + $\Delta_{CS-offset,i}$) mod L, where $\Delta_{CS-offset,i}$ is the i-th element of an array of n different CS indexes either pre-defined in the spec, or configured via higher layer signaling, or implicitly derived as a function of other system parameters and L is the maximum allowed CS value (e.g., L=12), and/or wherein the CS index applied on the $i^h$ PRB is defined as (initial CS index+$i*\Delta_{CS-offset}$) mod L, where i=1, 2, . . . , n, L is the maximum allowed CS value and $\Delta_{CS-offset}$ is a fixed offset either pre-defined in the spec or is configured by higher layer signaling, wherein initial CS index is derived similar to NR-licensed system, i.e. from the set of initial CS indexes (last column of table 1), the initial CS index is chosen as the $j^{th}$ index within the set, where if frequency hopping is enabled, $$j = \begin{cases} r_{PUCCH} \bmod N_{CS}, & \text{if } \lfloor r_{PUCCH}/8 \rfloor = 0 \\ (r_{PUCCH}-8) \bmod N_{CS}, & \text{if } \lfloor r_{PUCCH}/8 \rfloor = 1 \end{cases}$$

and when frequency hopping is disabled, j=$r_{PUCCH}$ mod $N_{CS}$. UE uses these implicitly derived PRB indices and CS index to extract a PUCCH resource configuration and transmits 1-bit HARQ-ACK in response to message 4 during initial access.

Example 5 includes the method of example 2 and/or some other examples herein, wherein other parameters in the PUCCH resource configuration table is modified, for example the first symbol and/or the number of symbols. The existing value(s) of PRB offset ($RB_{BWP}^{offset}$) is modified, for example by scaling the existing values to n*existing value (where 0<n<1) or configuring new values that are not necessarily scaled version of the existing values, so as to make sure OCB requirement can be met, wherein the maximum value of PRB offset in Table 1, viz. $\lfloor N_{BWP}^{size}/4 \rfloor$ can be reduced, when 80% OCB is mandated by regulation, and the method comprises:

transmitting or causing to transmit 1-bit HARQ-ACK in response to message 4 during initial access using the PUCCH resource configured by the modified parameters.

Example 6 includes the method of example 1 and/or some other examples herein, wherein PUCCH resource set before RRC connection set up is configured using multi-PRB PUCCH formats from NR-licensed including PUCCH formats 2 and 3, wherein each of these formats are configured with n PRBs mapped contiguously across frequency in order to meet OCB requirement, where $$n \geq \lceil \{OCB/(12*SCS)\} \rceil$$

wherein, if allowed by regulation, OCB can be met using frequency hopping, so that the combined bandwidth of PUCCH in two hops meets OCB requirement, while BW of each frequency hop can be less than OCB. In this case, each hop can have single PRB or more than one PRBs, wherein for PUCCH format 4 (single-PRB format) with enabled frequency hopping can also be considered for PUCCH resource configuration, and the method comprises:

transmitting or causing to transmit 1-bit HARQ-ACK in response to message 4 during initial access using PUCCH resource configured by PUCCH format 2 or 3 or 4.

Example 7 includes the method of example 6 and/or some other examples herein, wherein PUCCH formats 2/3 are used for PUCCH resource configuration during initial access and some of the existing parameters in NR-PUCCH format 2/3/4 configuration are revised, since these parameters are not available during initial access. As one example, cell radio network temporary identifier (C-RNTI) is not available during initial access, which is used in Rel-15 as scrambling ID for initializing scrambling sequence for encoded UCI bits, and instead of C-RNTI, TC-RNTI (temporary C-RNTI) available during initial access is used as scrambling ID, and the method comprises:

transmitting or causing to transmit 1-bit HARQ-ACK in response to message 4 of initial access using these revised PUCCH formats 2/3/4 for PUCCH resource configuration during initial access.

Example 8 includes the method of example 6 and/or some other examples herein, wherein a second column of NR-PUCCH resource configuration table, namely "PUCCH format" is modified to configure PUCCH formats 2 and 3 replacing PUCCH formats 0 and 1, and the last column of Table 1, i.e. "set of initial CS indexes" is modified to "set of initial indexes", which can be time domain/frequency domain shift index for PUCCH formats 2/3, wherein to enable time domain multiplexing, column 4 of table 1 (number of symbols) can be modified such that the time shifted PUCCH resource does not cross the slot boundary, wherein PUCCH resources configured with PUCCH formats 2/3 may not always be aligned with the slot boundary, and the method comprises:

transmitting or causing to transmit 1-bit HARQ-ACK in response to message 4 of random access using one of these PUCCH resources configured with PUCCH format 2/3/4 during initial access and transmits.

Example 9 includes the method of example 6 and/or some other examples herein, wherein the parameters that are implicitly derived for PUCCH resource configuration during initial access, for example PRB index in the 1$^{st}$ hop, PRB index in the 2$^{nd}$ hop and initial shift index in the set of shift indexes, are enhanced to multi-PRB PUCCH resource configuration in NR-unlicensed, wherein i$^{th}$ PRB index in the 1$^{st}$ and 2$^{nd}$ hops (when frequency hopping is enabled) are redefined as:

PRB index (1$^{st}$ hop) =

$$\begin{cases} RB_{BWP}^{offset} + \lfloor r_{PUCCH}/N_{CS} \rfloor + (i-1), & \text{if } \lfloor r_{PUCCH}/8 \rfloor = 0 \\ N_{BWP}^{size} - 1 - RB_{BWP}^{offset} - \lfloor (r_{PUCCH} - 8)/N_{CS} \rfloor - (i-1), \\ & \text{otherwise} \end{cases}$$

PRB indexes (2$^{nd}$ hop) ==

$$\begin{cases} RB_{BWP}^{offset} + \lfloor (r_{PUCCH} - 8)/N_{CS} \rfloor + (i-1), & \text{if } \lfloor r_{PUCCH}/8 \rfloor = 1 \\ N_{BWP}^{size} - 1 - RB_{BWP}^{offset} - \lfloor \frac{r_{PUCCH}}{N_{CS}} \rfloor - (i-1), & \text{otherwise} \end{cases}$$

where, i=1, 2, . . . , n and $N_{CS}$ denotes total number of shift indexes which can be a time domain shift, or frequency domain shift. If frequency hopping is disabled, then the PRB indexes are derived as:

PRB index (i$^{th}$ PRB)=$RB_{BWP}^{offset}+\lfloor r_{PUCCH}/N_{CS} \rfloor+(i-1), i=1,2, \ldots ,n$ wherein other modifications of PUCCH resource configuration table during initial access as mentioned in claims 2 through 4, for example modification of the values of PRB offset, first symbol, number of symbols etc. and inclusion of parameters like number of PRBs (n), intra-slot frequency hopping etc. are also applicable here, and the method comprises:

transmitting or causing to transmit 1-bit HARQ-ACK in response to message 4 during initial access using PUCCH resource configuration using these implicitly derived parameters.

Example 10 includes the method of example 1 and/or some other examples herein, wherein PUCCH resource set before RRC connection set up is configured using existing PUCCH formats used in NR-licensed operation, i.e. PUCCH formats 0 and 1 which are inherently single-PRB (each PRB consisting of 12 sub-carriers) PUCCH formats. Both these single-PRB PUCCH formats are enhanced to multiple PRBs (say, n PRBs, n≥2. Further, these n PRBs are allocated non-contiguously in frequency (e.g., by using PRB based interlace), with inter-PRB distance m in between two consecutive PRBs such that OCB requirement is met.

$$[(n-1)*m+1]*(12*SCS) \geq OCB$$

wherein an interlace-based design with number of PRBs per interlace, n=2 is sufficient to meet OCB requirement by setting appropriate inter-PRB distance (m), while n>2 can be used in some cases, for example to boost transmission power by exploiting PSD regulation (e.g., 10 dBm/1 MHz) and setting inter-PRB distance (m) accordingly (e.g., m is such that 12*SCS (in MHz)*m>1 MHz), and the method comprises:

transmitting or causing to transmit 1-bit HARQ-ACK in response to message 4 during initial access using PUCCH resource configuration using these enhanced PUCCH formats.

Example 11 includes the method of example 10 and/or some other examples herein, wherein NR-PUCCH resource configuration table is enhanced by providing additional parameters, which is either be pre-configured, or indicated by higher layer signaling (via MSI, RMSI or OSI), or implicitly derived in order to support non-contiguous allocation of n PRBs using PUCCH formats 0 and 1 for PUCCH resource set configuration before RRC connection setup, wherein the parameters are listed in the following table:

| Additional Parameters | Value |
| --- | --- |
| Number of PRBs (n) | n ≥ 2 |
| Inter-PRB distance (m) | 12 * SCS (in MHz) * m > 1 MHz |
| Cyclic shift offset applied on n PRBs | $\Delta_{CS\text{-}offset}$ |
| Intra-slot frequency hopping | 0 (disabled) | wherein $\Delta_{CS\text{-}offset}$ is either be a fixed offset, or a pattern of CS offsets which is predefined in specification, or configured via higher layer signaling or derived implicitly as a function of other parameters (e.g., PUCCH resource index, symbol/slot index etc.), wherein (n,m) is either be predefined, or is configured by higher layer signaling, or is a combination thereof (e.g., it is predefined, but that value is overwritten by higher layer signaling). Intra-slot frequency hopping is disabled (in contrary to NR-licensed operation, where it is always enabled for PUCCH resource configuration during initial access) since frequency diversity can be already be achieved by non-contiguous frequency allocation, and the method comprises:

transmitting or causing to transmit 1-bit HARQ-ACK in response to message 4 during initial access using the PUCCH resource configured by the parameters.

Example 12 includes the method of example 10 and/or some other examples herein, wherein some implicitly derived PUCCH resource parameters in NR-licensed, such as PRB index of the $1^{st}$ and $2^{nd}$ hops are repurposed to support PUCCH resource configuration with interlace-based PRB allocation in NR-unlicensed. For example, with n=2 and intra-slot frequency hopping disabled, PRB index of the $1^{st}$ and $2^{nd}$ PRBs are implicitly derived instead of PRB indexes of $1^{st}$ and $2^{nd}$ hops, wherein:

PRB index ($1^{st}$ PRB)=$\lfloor r_{PUCCH}/N_{CS} \rfloor$, and PRB index ($2^{nd}$ PRB)=$N_{BWP}^{size}-1-\lfloor ((r_{PUCCH,max}-r_{PUCCH})/N_{CS} \rfloor$, or the PRB index of the $2^{nd}$ PRB is derived as PRB index ($2^{nd}$ PRB)=$N_{BWP}^{size}-1-\lfloor r_{PUCCH}/N_{CS} \rfloor$, and wherein the PRB index of the $2^{nd}$ PRB can be selected as an offset from the PRB index of the $1^{st}$ PRB, while the offset is IPD and the existing parameter $RB_{BWP}^{offset}$ is revised to indicate IPD (m) of the interlace based structure, and wherein PRB index ($2^{nd}$ PRB)=PRB index ($1^{st}$ PRB)+($RB_{BWP}^{offset}$+1), and when n>2, PRB index of the $1^{st}$ PRB is derived as mentioned above and the PRB index of $i^{th}$ PRB of the interlace is derived as PRB index ($i^{th}$ PRB)=PRB index ($1^{st}$ PRB)+{($RB_{BWP}^{offset}$+1)*(i-1)} where $RB_{BWP}^{offset}$ is the inter-PRB distance and i=1, 2, 3, . . . , n, the CS index applied on the $i^{th}$ PRB is defined as (initial CS index+$\Delta_{CS\text{-}offset,i}$) mod L, where $\Delta_{CS\text{-}offset,i}$ is the i-th element of an array of n different CS indexes either pre-defined, configured via higher layer signaling, or implicitly derived as a function of other system parameters and L is the maximum allowed CS value (e.g., L=12), or the CS index applied on the $i^{th}$ PRB is defined as (initial CS index+$i*\Delta_{CS\text{-}offset}$) mod L, where i=1, 2, . . . , n, L is the maximum allowed CS value and $\Delta_{CS\text{-}offset}$ is a fixed offset either pre-defined or configured by higher layer signaling, wherein the initial CS index can be derived similar to NR-licensed system, i.e. from the set of initial CS indexes (last column of NR-PUCCH resource configuration table), and the initial CS index is chosen as the $j^{th}$ index within the set, where j=$r_{PUCCH}$ mod $N_{CS}$, and the method comprises:

transmitting or causing to transmit 1-bit HARQ-ACK in response to message 4 during initial access using the additional parameters for PUCCH resource configuration using PUCCH formats 2/3/4.

Example 13 includes the method of example 10 and/or some other examples herein, wherein the existing value(s) of PRB offset ($RB_{BWP}^{offset}$) is modified so as to make sure OCB requirement is met. For example, the maximum value of PRB offset in NR PUCCH resource configuration table, viz. $\lfloor N_{BWP}^{size}/4 \rfloor$ can be reduced, when 80% OCB is mandated by regulation, and the method comprises:

transmitting or causing to transmit 1-bit HARQ-ACK in response to message 4 during initial access using the modified parameters for PUCCH resource configuration.

Example 14 includes the method of example 1 and/or some other examples herein, wherein PUCCH resource set before RRC connection set up is configured using multi-PRB PUCCH formats from NR-licensed including PUCCH formats 2 and 3, wherein each of these formats is configured with n PRBs mapped non-contiguously across frequency (e.g., using PRB based interlace using n≥2), with inter-PRB distance m in between two consecutive PRBs such that OCB requirement is met.

$$[(n-1)*m+1]*(12*SCS) \geq OCB$$

wherein an interlace-based design with number of PRBs per interlace, n=2 is sufficient to meet OCB requirement by setting appropriate inter-PRB distance (m), while n>2 is used in some cases, for example to boost transmission power by exploiting PSD regulation (e.g., 10 dBm/1 MHz) and setting inter-PRB distance (m) accordingly (e.g., m is such that 12*SCS (in MHz)*m>1 MHz), and the method comprises:

transmitting or causing to transmit 1-bit HARQ-ACK in response to message 4 during initial access using the PUCCH resource configuration using these enhanced PUCCH formats.

Example 15 includes the method of example 14 and/or some other examples herein, wherein the second column of NR-PUCCH resource configuration table, namely "PUCCH format" is modified to configure PUCCH formats 2 and 3 replacing PUCCH formats 0 and 1, wherein the last column of the table, i.e. "set of initial CS indexes" is modified to "set of initial indexes", which is time domain/frequency domain shift index for PUCCH formats 2/3, wherein to enable time domain multiplexing, column 4 of the table (number of symbols) can be modified such that the time shifted PUCCH resource does not cross the slot boundary, and wherein PUCCH resources configured with PUCCH formats 2/3 may not be always aligned with the slot boundary, and wherein the table is enhanced by providing additional parameters, which are either be pre-configured, or indicated by higher layer signaling (via MSI, RMSI or OSI), or implicitly derived in order to support non-contiguous allocation of n PRBs using PUCCH formats 2 and 3 for PUCCH resource set configuration before RRC connection setup, wherein the parameters are listed in the following table:

| Additional Parameters | Value |
| --- | --- |
| Number of PRBs (n) | n ≥ 2 |
| Inter-PRB distance (m) | 12 * SCS (in MHz) * m > 1 MHz |
| Intra-slot frequency hopping | 0 (disabled) | wherein intra-slot frequency hopping is disabled (in contrary to NR-licensed operation, where it is always enabled for PUCCH resource configuration during initial access) since frequency diversity can be already be achieved by non-contiguous frequency allocation, and the method comprises:

transmitting or causing to transmit 1-bit HARQ-ACK in response to message 4 during initial access using PUCCH resource configured by the additional parameters along with the enhanced PUCCH formats.

Example 16 includes the method of example 14 and/or some other examples herein, wherein some implicitly derived PUCCH resource parameters in NR-licensed, such as PRB index of the $1^{st}$ and $2^{nd}$ hops are repurposed to support PUCCH resource configuration with interlace-based PRB allocation in NR-unlicensed. For example, with n=2 and intra-slot frequency hopping disabled, PRB index of the $1^{st}$ and $2^{nd}$ PRBs are implicitly derived instead of PRB indexes of $1^{st}$ and $2^{nd}$ hops, wherein:

PRB index ($1^{st}$ PRB)=$\lfloor r_{PUCCH}/N_{CS} \rfloor$, and PRB index ($2^{nd}$ PRB)=$N_{BWP}^{size}-1-\lfloor ((r_{PUCCH,max}-r_{PUCCH})/N_{CS} \rfloor$, or the PRB index of the $2^{nd}$ PRB can be derived as PRB index ($2^{nd}$ PRB)=$N_{BWP}^{size}-1-\lfloor r_{PUCCH}/N_{CS} \rfloor$, and/or the PRB index of the $2^{nd}$ PRB is selected as an offset from the PRB index of the $1^{st}$ PRB, while the offset is IPD and the existing parameter $RB_{BWP}^{offset}$ is revised to indicate IPD (m) of the interlace based structure, and wherein:

PRB index ($2^{nd}$ PRB)=PRB index ($1^{st}$ PRB)+ ($RB_{BWP}^{offset}$+1)

wherein when n>2, PRB index of the $1^{st}$ PRB is derived as mentioned above and the PRB index of $i^{th}$ PRB of the interlace is derived as PRB index ($i^{th}$ PRB)=PRB index ($1^{st}$ PRB)+{($RB_{BWP}^{offset}$+1)*(i-1)}, where $RB_{BWP}^{offset}$ is the inter-PRB distance and i=1, 2, 3, . . . ,n and $N_{CS}$ denotes total number of shift indexes which is a time domain shift, or frequency domain index, wherein other modifications of PUCCH resource configuration table, for example modification of the values of PRB offset etc. are also applicable here, wherein the above claims related to non-contiguous frequency allocation (claims 9 through 15) are also applicable if frequency hopping is enabled, and wherein if frequency hopping is enabled, PRB indices of the $1^{st}$ hop and $2^{nd}$ hop are additionally derived, and the method comprises:

transmitting or causing to transmit 1-bit HARQ-ACK in response to message 4 during initial access using the implicitly derived/additional parameters for PUCCH resource configuration using PUCCH formats 2/3.

Example 17 includes the method of example 1 and/or some other examples herein, wherein multiple first symbols in a slot is defined corresponding to one row in the PUCCH resource configuration table so that listen-before-talk (LBT) congestion can be alleviated and depending on LBT outcome, and the method comprises:

determining or causing to determine (or selecting or causing to select) a first symbol for PUCCH transmission; and applying or causing to apply puncturing or rate matching as appropriate, or wherein the last symbol of PUCCH is always aligned with slot boundary, i.e., when the first symbol is determined, the length of PUCCH transmission is also determined.

Example 18 includes the method of example 17 and/or some other examples herein, wherein multiple slot opportunities are configured for PUCCH transmission, wherein a PUCCH transmission window is defined wherein the window size is configured via RMSI, and the method comprises:

transmitting or causing to transmit the PUCCH starting from the indicated slot;

continuing or causing to continue, if the LBT fails, to try a next available UL slot for PUCCH transmission until the last slot in the window is reached, wherein in each slot, the same starting symbol is used for PUCCH transmission, wherein the current starting symbol in the table can be maintained, and wherein the method is applicable irrespective of PUCCH formats used for resource configuration and applicable to both contiguous and non-contiguous frequency allocations.

Example 19 includes the method of example 1 and/or some other examples herein, wherein applying OCC can be an additional dimension to further randomize interference for PUCCH formats 0/2, for example, for enhanced PUCCH format 0 with 2 symbols, length-2 OCC could be applied, wherein the applied OCC index can be bound to cyclic shifts.

Example 19.5 includes the method of examples 10 and 14 and/or some other examples herein, wherein new short and long PUCCH formats are defined for interlace based (i.e. non-contiguous) frequency allocation of PUCCH resource configuration before initial access, wherein while the short PUCCH format can be based on NR PUCCH formats 0/2 and the long PUCCH format can be based on NR PUCCH formats 1/3/4, the new formats designed for interlace based frequency allocation can have additional features, wherein PUCCH formats 0/2 in NR can be extended to have more than 2 symbols (while PUCCH formats 0/2 in NR are restricted to maximum 2 symbols), and the new long PUCCH format spanning over more than 1 PRBs can have per PRB different OCCs applied over the multiple symbols for interference randomization.

Example 20 includes the method of examples 1-19.5 and/or some other examples herein, wherein the method is performed by a user equipment (UE).

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a frame, packet, message, or protocol data unit as described in or related to any of examples 1-20, or portions or parts thereof.

Example 28 may include a method of communicating in a wireless network as shown and described herein.

Example 29 may include a system for providing wireless communication as shown and described herein.

Example 30 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein, but are not meant to be limiting.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB enhanced Mobile Broadband
eMBMS Evolved MBMS
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunneling Protocol for User Plane
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Pro11
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasuremeniTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus, comprising:
processor circuitry configured to determine multiple physical resource blocks (PRBs) to be used for transmitting over an initial physical uplink control channel (PUCCH) before a dedicated PUCCH resource is configured,
wherein a number of the multiple PRBs is determined based at least on an Occupied Channel Bandwidth (OCB) criteria for the initial PUCCH and a sub-carrier spacing (SCS); and
radio front end circuitry, coupled with the processor circuitry, and configured to transmit over the initial PUCCH using the multiple PRBs and before the dedicated PUCCH resource is configured, wherein the dedicated PUCCH resource configuration is associated with a Radio Resource Control (RRC) connection setup.

2. The apparatus of claim 1, wherein the initial PUCCH comprises a PUCCH format 0, a PUCCH format 1, a PUCCH format 2, or a PUCCH format 3 and the processor circuitry is configured to allocate the multiple PRBs contiguously in frequency.

3. The apparatus of claim 2, wherein to transmit over the initial PUCCH using the multiple PRBs, the radio front end circuitry is configured to transmit 1-bit hybrid automatic repeat request-acknowledgement (HARQ-ACK).

4. The apparatus of claim 2, wherein the processor circuitry is configured to change the number of the multiple PRBs based at least on a predetermined requirement.

5. The apparatus of claim 2, wherein the processor circuitry is further configured to determine additional parameters associated with the initial PUCCH, the additional parameters comprising a cyclic shift offset and an intra-slot frequency hopping parameter.

6. The apparatus of claim 1, wherein the initial PUCCH comprises a PUCCH format 0, a PUCCH format 1, a PUCCH format 2, or a PUCCH format 3 and the processor circuitry is configured to allocate the multiple PRBs non-contiguously in frequency.

7. The apparatus of claim 6, wherein the processor circuitry is configured to allocate the multiple PRBs such that a distance between two consecutive PRBs is based on the OCB criteria for the initial PUCCH and the SCS.

8. The apparatus of claim 7, wherein the processor circuitry is further configured to determine additional parameters associated with the initial PUCCH, the additional parameters comprising the distance between the two consecutive PRBs, a cyclic shift offset, and an intra-slot frequency hopping parameter.

9. The apparatus of claim 1, wherein the number of the multiple PRBs (n) is determined such that the number of the multiple PRBs (n) meets at least one of the following equations:

$$n \geq \lceil \{OCB/(12*SCS)\} \rceil \text{ or } [(n-1)*m+1]*(12*SCS) \geq OCB$$

wherein m is an inter-PRB distance between two consecutive PRBs and [ . . . ] is a ceiling function.

10. A method, comprising:
determining multiple physical resource blocks (PRBs) to be used for transmitting over an initial physical uplink control channel (PUCCH), before a dedicated PUCCH resource is configured, wherein a number of the multiple PRBs is determined based at least on an Occupied Channel Bandwidth (OCB) criteria for the initial PUCCH and a sub-carrier spacing (SCS);
allocating the multiple PRBs contiguously or non-contiguously in frequency; and
transmitting data over the initial PUCCH using the multiple PRBs before the dedicated PUCCH resource is configured, wherein the dedicated PUCCH resource configuration is associated with a Radio Resource Control (RRC) connection setup.

11. The method of claim 10, wherein transmitting over the initial PUCCH using the multiple PRBs comprises transmitting 1-bit hybrid automatic repeat request-acknowledgement (HARQ-ACK).

12. The method of claim 10, further comprising:
changing the number of the multiple PRBs.

13. The method of claim 10, further comprising: determining additional parameters associated with the initial PUCCH, the additional parameters comprising at least one of a distance between two consecutive PRBs, a cyclic shift offset, or an intra-slot frequency hopping parameter.

14. The method of claim 10, further comprising:
allocating the multiple PRBs such that a distance between two consecutive PRBs is based on the OCB criteria for the initial PUCCH and the SCS.

15. The method of claim 10, wherein the number of the multiple PRBs is further determined based on a maximum power spectral density or a total maximum transmission power.

16. A user equipment (UE), comprising:
a memory that stores instructions; and
a processor, upon executing the instructions, configured to:
determine multiple physical resource blocks (PRBs) to be used for transmitting over an initial physical uplink control channel (PUCCH) before a dedicated PUCCH resource is configured, wherein a number of the multiple PRBs is determined based at least on an Occupied Channel Bandwidth (OCB) criteria for the initial PUCCH and a sub-carrier spacing (SCS); and
cause transmission of data over the initial PUCCH using the multiple PRBs and before the dedicated PUCCH resource is configured, wherein the dedicated PUCCH resource configuration is associated with a Radio Resource Control (RRC) connection setup.

17. The UE of claim 16, wherein the initial PUCCH comprises a PUCCH format 0, a PUCCH format 1, a PUCCH format 2, or a PUCCH format 3 and the processor is configured to allocate the multiple PRBs contiguously in frequency.

18. The UE of claim 17, wherein the processor is configured to change the number of the multiple PRBs.

19. The UE of claim 16, wherein the initial PUCCH comprises a PUCCH format 0, a PUCCH format 1, a PUCCH format 2, or a PUCCH format 3 and the processor is configured to allocate the multiple PRBs non-contiguously in frequency.

20. The UE of claim 16, wherein the number of the multiple PRBs is further determined based on a maximum power spectral density or a total maximum transmission power and wherein the UE is configured to operate in unlicensed spectrum.

* * * * *